(12) United States Patent
Cheng et al.

(10) Patent No.: US 10,839,543 B2
(45) Date of Patent: Nov. 17, 2020

(54) SYSTEMS AND METHODS FOR DEPTH ESTIMATION USING CONVOLUTIONAL SPATIAL PROPAGATION NETWORKS

(71) Applicant: Baidu USA, LLC, Sunnyvale, CA (US)

(72) Inventors: Xinjing Cheng, Beijing (CN); Peng Wang, Sunnyvale, CA (US); Ruigang Yang, Beijing (CN)

(73) Assignee: Baidu USA LLC, Sunnyvale, CA (US)

( * ) Notice: Subject to any disclaimer, the term of this patent is extended or adjusted under 35 U.S.C. 154(b) by 26 days.

(21) Appl. No.: 16/286,484

(22) Filed: Feb. 26, 2019

(65) Prior Publication Data

US 2020/0273192 A1     Aug. 27, 2020

(51) Int. Cl.
*G06T 7/593* (2017.01)
*G06K 9/62* (2006.01)

(52) U.S. Cl.
CPC ............ *G06T 7/593* (2017.01); *G06K 9/6232* (2013.01); *G06T 2207/10012* (2013.01); *G06T 2207/20081* (2013.01); *G06T 2207/20084* (2013.01)

(58) Field of Classification Search
CPC ......... G06T 7/593; G06T 7/0012; G06T 7/11; G06T 7/33; G06T 7/50; G06T 7/55; G06T 2207/20081–20084; G06T 2207/10012; G06T 2207/10028; G06T 2207/10024; G06T 2207/10081; G06T 2207/10088; G06T 2207/20016; G06K 9/6232; G06K 9/6256; G06K 9/00201; G06K 9/4628; G06K 9/6202; G06K 9/6271; G06K 9/66;

(Continued)

(56) References Cited

U.S. PATENT DOCUMENTS 9,633,282 B2 * 4/2017 Sharma ................ G06K 9/6256
9,892,522 B2 * 2/2018 Smirnov ................ G06T 7/593

(Continued)

OTHER PUBLICATIONS

Chen et al.,"DeepDriving: Learning affordance for direct perception in autonomous driving," arXiv preprint arXiv:1505.00256, 2015. (9pgs).

(Continued)

*Primary Examiner* — Michael S Osinski
(74) *Attorney, Agent, or Firm* — North Weber & Baugh LLP

(57) ABSTRACT

Presented are systems and methods for improving speed and quality of real-time per-pixel depth estimation of scene layouts from a single image by using a 3D end-to-end Convolutional Spatial Propagation Network (CSPN). An efficient linear propagation model performs propagation using a recurrent convolutional operation. The affinity among neighboring pixels may be learned through a deep convolutional neural network (CNN). The CSPN may be applied to two depth estimation tasks, given a single image: (1) to refine the depth output of existing methods, and (2) to convert sparse depth samples to a dense depth map, e.g., by embedding the depth samples within the propagation procedure. For stereo depth estimation, the 3D CPSN is applied to stereo matching by adding a diffusion dimension over discrete disparity space and feature scale space. This aids the recovered stereo depth to generate more details and to avoid error matching from noisy appearance caused by sunlight, shadow, and similar effects.

20 Claims, 16 Drawing Sheets

(58) Field of Classification Search
CPC ........... G06K 9/00208; G06K 9/00805; G06K 9/3233; G06K 9/4604; G06K 9/4619; G06N 3/0454; G06N 3/08; G06N 3/084; G06N 3/088; G06N 3/04; G06N 3/063; G06N 3/0445; G06N 3/0481; G06N 3/0472; H04N 2013/0081; H04N 13/271; H04N 13/128; H04N 13/239; H04N 13/122; H04N 13/133
See application file for complete search history.

(56) References Cited

U.S. PATENT DOCUMENTS

| | | | |
|---|---|---|---|
| 9,998,725 B2* | 6/2018 | Chang | G06T 3/4007 |
| 10,140,572 B2* | 11/2018 | Bittner, Jr. | G06N 3/04 |
| 10,304,193 B1* | 5/2019 | Wang | G06N 3/0481 |
| 10,380,753 B1* | 8/2019 | Csordas | G06T 7/33 |
| 10,408,939 B1* | 9/2019 | Kim | G06K 9/00791 |
| 10,540,590 B2* | 1/2020 | Wang | G06K 9/34 |
| 10,542,249 B2* | 1/2020 | Wang | H04N 13/257 |
| 10,554,957 B2* | 2/2020 | Valentin | G06T 7/593 |
| 10,650,278 B1* | 5/2020 | Ho | G06T 7/11 |
| 10,663,594 B2* | 5/2020 | Tsishkou | G01S 7/4808 |
| 2016/0379111 A1* | 12/2016 | Bittner, Jr. | G06N 3/04 706/25 |
| 2017/0046616 A1* | 2/2017 | Socher | G06K 9/4628 |
| 2018/0033144 A1* | 2/2018 | Risman | G16H 30/20 |
| 2018/0157892 A1* | 6/2018 | Han | G06K 9/00617 |
| 2018/0211401 A1* | 7/2018 | Lee | G06T 7/593 |
| 2018/0231871 A1* | 8/2018 | Wang | G06N 3/08 |
| 2018/0373981 A1* | 12/2018 | Hu | G06F 12/0207 |
| 2019/0030371 A1* | 1/2019 | Han | G06N 3/08 |
| 2019/0050999 A1* | 2/2019 | Piat | G06T 15/08 |
| 2019/0073569 A1* | 3/2019 | Ben-Ari | G16H 50/20 |
| 2019/0213481 A1* | 7/2019 | Godard | G06N 3/0454 |
| 2019/0287259 A1* | 9/2019 | Tankovich | H04N 13/204 |
| 2019/0295282 A1* | 9/2019 | Smolyanskiy | G01S 13/931 |
| 2019/0304113 A1* | 10/2019 | Huang | G06T 5/001 |
| 2019/0362514 A1* | 11/2019 | Sinha | G06K 9/6274 |
| 2019/0371080 A1* | 12/2019 | Sminchisescu | G06T 19/00 |
| 2019/0385325 A1* | 12/2019 | Kweon | G06T 3/4007 |
| 2020/0019794 A1* | 1/2020 | Engelcke | G06N 3/04 |
| 2020/0026951 A1* | 1/2020 | Chowdhury | G06T 3/40 |
| 2020/0027002 A1* | 1/2020 | Hickson | G06K 9/6218 |
| 2020/0074661 A1* | 3/2020 | Anisimovskiy | G06T 3/0006 |
| 2020/0082641 A1* | 3/2020 | Watanabe | G06T 15/50 |
| 2020/0104690 A1* | 4/2020 | Bai | G06F 15/7825 |
| 2020/0120324 A1* | 4/2020 | Kwong | G06T 5/20 |
| 2020/0134848 A1* | 4/2020 | El-Khamy | H04N 13/133 |
| 2020/0138360 A1* | 5/2020 | Fan | A61B 5/7264 |
| 2020/0151492 A1* | 5/2020 | Chen | G06K 9/6256 |
| 2020/0160533 A1* | 5/2020 | Du | G06K 9/4604 |
| 2020/0160535 A1* | 5/2020 | Ali Akbarian | G06N 7/00 |
| 2020/0160546 A1* | 5/2020 | Gu | G06N 20/10 |
| 2020/0167974 A1* | 5/2020 | Liu | A61M 5/007 |

OTHER PUBLICATIONS

Murray et al., "Using real-time stereo vision for mobile robot navigation," autonomous robots, vol. 8, No. 2, pp. 161-171, 2000. (3pgs).
Biswas et al., "Depth camera based localization and navigation for indoor mobile robots," in RGB-D Workshop at RSS, 2011. (3pgs).
Haque et al., "Obstacle avoidance using stereo camera," arXiv preprint arXiv:1705.04114, 2017.(7pgs).
Bascle et al., "Stereo matching, reconstruction and refinement of 3d curves using deformable contours," Intr. Conference on Computer Vision, IEEE,1993. (2pgs).
Zhang et al., "Meshstereo:A global stereo model with mesh alignment regularization for view interpolation," In Proceedings of the IEEE Intr. Conf.on Computer Vision, 2015.(9pgs.
Xu et al., "Epipolar geometry in stereo, motion and object recognition: A unified approach," Springer Science & Business Media, 2013, vol. 6. (5 pgs).

Qi et al., "3D Graph Neural Networks for RGBD Semantic Segmentation," in ICCV, 2017. (10 pgs).
Liao et al., "Parse Geometry from a Line: Monocular Depth Estimation with Partial Laser Observation," arXiv preprint arXiv:1611.02174, 2016. (9 pgs).
Ma et al., "Sparse-to-Dense: Depth Prediction fromSparse Depth Samples and a Single Image," arXiv preprint arXiv:1709.07492, 2018. (8pgs).
Velodyne Lidar, "HDL-64E,"[online], [Retrieved Jul. 15, 2020]. Retrieved from Internet <URL:https://velodynelidar.com/products/hdl-64e/> (10pgs).
Eigen et al., "Predicting Depth, Surface Normals and Semantic Labelswith a Common Multi-Scale Convolutional Architecture," arXiv preprint arXiv:1411.4734, 2015. (9pgs).
Laina et al., "Deeper depth prediction with fully convolutional residual networks," arXiv preprint arXiv:1606.00373, 2016. (12 pgs).
Silberman et al., "Indoor Segmentation and Support Inferencefrom RGBD Images," ECCV, 2012. (15pgs).
Xiao et al., "SUN3D: A Database of Big Spaces Reconstructed using SfM and Object Labels," in ICCV, 2013. (1pg).
Chang et al., "Matterport3D: Learning from RGB-D data in indoor environments," arXiv preprint arXiv:1709.06158, 2017. (25 pgs).
Geiger et al., "Are we ready for Autonomous Driving?The KITTI Vision Benchmark Suite," in CVPR, 2012. (8 pgs).
Wang et al., "TorontoCity: Seeing the World with a Million Eyes," arXiv preprint arXiv:1612.00423, 2016. (9 pgs).
Huang et al., "The Apollo Scape Open Dataset for AutonomousDriving and its Application," arXiv preprint arXiv:1803.06184, 2018. (17 pgs).
Simonyan et al., "Very deep convolutional networks for large-scale image recognition," arXiv preprint arXiv:1409.1556, 2015. (14pgs).
He et al., "Deep Residual Learning for Image Recognition," arXiv preprint arXiv:1512.03385, 2015. (12pgs).
Long et al., "Fully Convolutional Networks for Semantic Segmentation," arXiv preprint arXiv:1411.4038, 2015. (10pgs).
Ronneberger et al., "U-Net: Convolutional Networks for Biomedical Image Segmentation," arXiv preprint arXiv:1505.04597, 2015. (8pgs).
Barron et al., "The Fast Bilateral Solver," arXiv preprint arXiv:1511.03296, 2016. (50pgs).
Liu et al., "Learning Affinity via Spatial Propagation Networks," arXiv preprint arXiv:1710.01020, 2017. (14pgs).
Chang et al., "Pyramid Stereo Matching Network," arXiv preprint arXiv:1803.08669, 2018. (9pgs).
RealSense, "D400," [online], [Retrieved Jul. 15, 2020]. Retrieved from Internet <URL: https://www.intelrealsense.com/stereo-depth/> (8pgs).
Zbontar et al., "Stereo Matching by Training a Convolutional Neural Network to Compare Image Patches," arXiv preprint arXiv:1510.0597, 2016. (32pgs).
Kendall et al., "End-to-End Learning of Geometry and Context for Deep Stereo Regression," arXiv preprint arXiv:1703.04309, 2017. (10pgs).
He et al., "Spatial Pyramid Pooling in Deep Convolutional Networks for Visual Recognition," arXiv preprint arXiv:1406.4729, 2015. (14pgs).
Newell et al., "Stacked hourglass networks for human pose estimation," arXiv preprint arXiv:1603.06937, 2016. (17 pgs).
Chen et al., "Rethinking atrous convolution for semantic image segmentation," arXiv preprint arXiv:1706.05587, 2017. (14 pgs).
Mayer et al., "A Large Dataset to Train Convolutional Networksfor Disparity, Optical Flow, and Scene Flow Estimation," arXiv preprint arXiv:1512.02134, 2015. (14 pgs).
Menze et al., "Object scene flow," ISPRS Journal of Photogrammetry and Remote Sensing (JPRS), 2018. (1pg).
Wang et al., "Designing deep networks for surface normal estimation," arXiv preprint arXiv:1411.4958, 2014. (9 pgs).
Li et al., "A Two-Streamed Network for Estimating Fine-ScaledDepth Maps from Single RGB Images," arXiv preprint arXiv:1607.00730, 2017. (9 pgs).
Luo et al., "Single view stereo matching," arXiv preprint arXiv:1803.02612, 2018. ( 9 pgs).

(56) References Cited

OTHER PUBLICATIONS

Jiao et al.,"Look Deeper into Depth: Monocular Depth Estimation with Semantic Booster and Attention-Driven Loss," in ECCV. Springer, 2018. (17 pgs).
Fu et al.,"Deep ordinal regression network for monocular depth estimationar," Xiv preprint arXiv:1806.02446, 2018. (10pgs).
Kuznietsov et al.,"Semi-supervised deep learning for monocular depth map prediction," Xiv preprint arXiv: 1702.02706, 2017. (14pgs).
Godard et al.,"Unsupervised monocular depth estimation with left-right consistency," arXiv preprint arXiv:1609.03677, 2017. (14pgs).
Zhou et al.,"Unsupervised learning of depth and ego-motion from video," in CVPR, 2017. (10pgs).
Yang et al.,"Unsupervised Learning of Geometry from Videos with Edge-aware Depth-NormalConsistenc," arXiv preprint arXiv:1711.03665, 2017. (8 pgs).
Yang et al.,"LEGO: Learning Edge with Geometry all at Once by Watching Videos," arXiv preprint arXiv:1803.05648, 2018. (13pgs).
Luo et al.,"Every Pixel Counts ++: Joint Learning ofGeometry and Motion with 3D HolisticUnderstanding," arXiv preprint arXiv:1810.06125, 2018. (15 pgs).
Jiang et al.,"Self-supervised relative depth learning for urban scene understanding,"arXiv preprint arXiv:1712.04850, 2018. (17pgs).
Wang et al.,"Towards Unified Depth and Semantic Prediction from a Single Image," in CVPR, 2015. (10pgs).
Liu et al.,"Deep convolutional neural fields for depth estimation from a single image," arXiv preprint arXiv:1411.6387, 2014. (13pgs).
Li et al.,"Depth and surface normal estimation from monocular images using regression on deep features andhierarchical CRFs," in CVPR, 2015. (1pg).
Xu et al.,"Multi-scale continuous crfs as sequential deep networks for monocular depth estimation,"arXiv preprint arXiv: 1704.02157, 2017. (9 pgs).
Xu et al.,"Structured attention guided convolutional neural fields for monocular depth estimation," arXiv preprint arXiv:1803.11029, 2018. (9 pgs).
Heo et al.,"Monocular depth estimation using whole strip masking and reliability-based refinement," in ECCV, 2018. (16 pgs).
Wang et al.,"SURGE: surface regularized geometry estimation from a single image," in NIPS, 2016. (9 pgs).
Qi et al.,"GeoNet: Geometric Neural Network for Joint Depth and Surface Normal Estimatio," in IEEE Conf. on Computer Vision & Pattern Recognition (CVPR), 2018. (2pgs).
Xu et al.,"PAD-Net: Multi-Tasks Guided Prediction-and-Distillation Networkfor Simultaneous Depth Estimation and Scene Parsing," arXiv preprint arXiv:1805.04409, 2018.(10 pgs).
Shi et al.,"Normalized cuts and image segmentation," TPAMI, vol. 22, No. 8, 2000. (52pgs).
Matsuo et al.,"Depth Image Enhancement Using Local Tangent Plane Approximations," in CVPR, 2015. (10 pgs).
Ferstl et al.,"Image Guided Depth Upsampling using Anisotropic Total Generalized Variation," in ICCV, 2013. (8pgs).
Ferstl et al.,"Variational Depth Superresolution using Example-Based Edge Representations," in ICCV, 2015. (9pgs).
Liu et al.,"Learning to Diffuse: A New Perspective to Design PDEs for Visual Analysis," IEEE transactions on pattern analysis & machine intelligence, 2016. (2pgs).
Dong et al.,"Learning a Deep Convolutional Network forImage Super-Resolution," [online], [Retrieved May 12, 2020]. Retrieved from Internet <URL:.
Yang et al.,"Color-Guided Depth Recovery From RGB-D Data Using an Adaptive Autoregressive Model," IEEE TIP, vol. 23, 2014. (2 pgs).
Song et al.,"Deep depth super-resolution: Learning depth super-resolution using deep convolutional neural network,"arXiv preprint arXiv:1607.01977, 2016. (13pgs).
Hui et al.,"Depth Map Super-Resolution by Deep Multi-Scale Guidance," in European Conference on Computer Vision, Springer, 2016. (3 pgs).

Kwon et al.,"Data-Driven Depth Map Refinement via Multi-scale Sparse Representation," in CVPR, 2015. (9 pgs).
Riegler et al.,"ATGV-Net: Accurate Depth Super-Resolution," arXiv preprint arXiv:1607.07988, 2016. (32pgs).
J. Weickert, "Anisotropic diffusion in image processing," Teubner Stuttgart, 1998, vol. 1. (184pgs).
Maire et al.,"Affinity CNN: Learning Pixel-Centric Pairwise Relations for Figure/Ground Embedding," Xiv preprint arXiv:1512.02767, 2016. (11pgs).
Bertasius et al.,"Convolutional random walk networks for semantic image segmentation," arXiv preprint arXiv:1605.07681, 2017. (9pgs).
Chen et al.,"Semantic Image Segmentation with Task-Specific Edge Detection Using CNNs & a Discriminatively Trained Domain Transform,"arXivpreprint arXiv:1511.03328, 2016.(14p).
Ma et al.,"Self-supervised sparse-to-dense: Self-supervised depth completion from lidar and monocular camera," arXiv preprint arXiv: 1807.00275, 2018. (12pgs).
Zimmermann et al.,"Learning for Active 3D Mapping," arXiv preprint arXiv:1708.02074, 2017. (9pgs).
Ladicky et al.,"From Point Clouds to Mesh using Regression," in The IEEE International Conference on Computer Vision (ICCV), 2017. (10 pgs).
Uhrig et al.,"Sparsity Invariant CNNs," arXiv preprint arXiv:1708.06500, 2017. (16pgs).
Zhang et al.,"Deep Depth Completion of a Single RGB-D Image," arXiv preprint arXiv:1803.09326, 2018. (20 pgs).
Scharstein et al.,"A Taxonomy and Evaluation of Dense Two-FrameStereo Correspondence Algorithms," International journal of computer vision, vol. 47, No. 1-3, 2002. (35 pgs).
H. Hirschmuller,"Stereo Processing by Semi-Global Matchingand Mutual Information,"IEEE Transactions on pattern analysis & machine intelligence, 2007. (14pgs).
Heise et al.,"PM-Huber: PatchMatch with Huber Regularization for Stereo Matching,"in Proceedings of the IEEE Intr. Conf. on Computer Vision, 2013. (8pgs).
Wang et al.,"Stereoscopic inpainting: Joint color and depth completion from stereo images," in CVPR. IEEE, 2008. (8 pgs).
Feng et al.,"Efficient deep learning for stereo matching with larger image patches,"10th Image & Signal Processing, BioMedical Engineering & Informatics(CISP-BMEI), 2017.(2pg).
Luo, et al.,"Efficient deep learning for stereo matching," in Proc. of the IEEE Conf. on Computer Vision & Pattern Recognition, 2016. (9pgs).
Shaked et al.,"Improved stereo matching with constant highway networks and reflective confidence learning,"arXiv preprint arXiv:1701.00165, 2016. (13pgs).
Guney et al.,"Displets: Displets: Resolving Stereo Ambiguities using Object Knowledge," in Proc. of the IEEE Conf. on Computer Vision & Pattern Recognition, 2015. (11pgs).
Ilg et al.,"FlowNet 2.0: Evolution of Optical Flow Estimation with Deep Networks," arXiv preprint arXiv:1612.01925, 2016. (16pgs).
Sun et al., PWC-Net: CNNs for Optical Flow Using Pyramid, Warping, and Cost Volume, arXiv preprint arXiv:1709.02371, 2018. (18pgs).
Liu et al.,"PARSENET: Looking Wider to See Better," arXiv preprint arXiv:1506.04579, 2015. (11pgs).
Chen et al.,"DeepLab: Semantic Image Segmentation withDeep Convolutional Nets, Atrous Convolution,and Fully Connected CRFs," arXiv preprint arXiv:1606.00915, 2017. (14pgs).
Zhao et al.,"Pyramid Scene Parsing Network," arXiv preprint arXiv:1612.01105, 2017. (11 pgs).
Gershgorin et al.,"Uber die abgrenzung der eigenwerte einer matrix," Izvestiya Akademii Nauk SSR, 7, 749-754,1931. (1 pg).
Kschischang et al.,"Factor Graphs and the Sum-Product Algorithm," IEEE Transactions on information theory, vol. 47, No. 2, pp. 498-519, 2001. (22pgs).
Krahenbuhl et al.,"Efficient Inference in Fully Connected CRFs withGaussian Edge Potentials," arXiv preprint arXiv:1210.5644, 2012. (9pgs).
Vaswani et al.,"Attention Is All You Need," arXiv preprint arXiv:1706.03762, 2017. (15 pgs).
Sobel et al.,"History and definition of the sobel operator," 2014. [online], [Retrieved May 12, 2020]. Retrieved from Internet <URL:.

(56) References Cited

OTHER PUBLICATIONS

Chen et al.,"Attention to scale: Scale-aware semantic image segmentation," arXiv preprint arXiv:1511.03339, 2016. (14pgs).
Igarashi et al.,"As-Rigid-As-Possible Shape Manipulation," ACM transactions on Graphics (TOG), 2005. (8pgs).
Deng et al,"ImageNet: A Large-Scale Hierarchical Image Database," in Computer Vision & Pattern Recognition, 2009. CVPR 2009. IEEE Conference on. IEEE, 2009. (8pgs).
Kingma et al.,"ADAM: A Method Forstochasticoptimization," arXiv preprint arXiv:1412.6980, 2017. (15 pgs).
Seki et al.,"SGM-Nets: Semi-global matching with neural networks," in Proc. of the 2017 IEEE Conf. on Computer Vision & Pattern Recognition Workshops (CVPRW), 2017. (10pgs).
Liang et al.,"Learning for Disparity Estimation through Feature Constancy," arXiv preprint arXiv:1712.01039, 2018. (10 pgs).
Song et al.,"EdgeStereo: A Context Integrated ResidualPyramid Network for Stereo Matching," arXiv preprint arXiv:1803.05196, 2018.(16 pgs).
Liang et al.,"Learning for disparity estimation through feature constancy," iarXiv preprint arXiv:1712.01039, 2018. (10pgs).
Cheng et al.,"Learning Depth with Convolutional SpatialPropagation Network," arXiv preprint arXiv:1810.02695v1, 2018. (17 pgs).
Cheng et al.,"Learning Depth with Convolutional SpatialPropagation Network," arXiv preprint arXiv:1810.02695v2, 2018. (17 pgs).

\* cited by examiner

1200

1300

SYSTEMS AND METHODS FOR DEPTH ESTIMATION USING CONVOLUTIONAL SPATIAL PROPAGATION NETWORKS

BACKGROUND

A. Technical Field

The present disclosure relates generally to systems, devices, and methods for image-based depth estimation that may be used for various applications such as augmented reality (AR), autonomous driving, and robotics.

B. Background

Depth estimation from a single image, i.e., predicting per-pixel distance to the camera, is a fundamental problem in computer vision and has many applications that range from AR, autonomous driving, to robotics. Depth estimation also serves as a foundation for supporting other computer vision tasks, such as 3D reconstruction and recognition. Recent efforts to estimate per-pixel depths from a single image have yielded high-quality outputs by taking advantage of deep fully convolutional neural networks (e.g., large amount of training data from indoor and outdoor). The improvement consists mainly in a more accurate estimation of global scene layout and scales with advanced networks, such as Visual Geometry Group (VGG) and residual network (ResNet), and better local structure recovery through deconvolution operation, skip-connections, and up-projection. Upon closer inspection of the output of some approaches, however, the predicted depths are rather blurry and do not align well with the structures in the image, such as object silhouette.

This may be mostly due to the supervised learning pipeline that primarily optimizes the per-pixel errors with high-level features, while paying less attention to the neighboring relationship that exhibits local similarities. Commonly used and effective strategies to address such an issue include affinity propagation through non-local densely connected conditional random fields (CRF), and bilateral filtering.

Existing approaches oftentimes utilize manually designed affinity between neighboring pixels, which could depend on Euclidean distances between RGB values or transformed features from image edges. Recently, some researchers have proposed to directly learn the image-dependent affinity through a deep convolutional neural network (CNN) using a spatial propagation network (SPN), which yields better results when compared to manually designed affinity on image segmentation. However, in such an approach, propagation is performed in a scan-line or scan-column fashion, which is serial in nature. As a result, when propagating left-to-right, pixels at the right-most column must wait for the information from the left-most column to update their value. Depth refinement commonly needs a local context rather than a global one.

Accordingly, what is needed are systems and methods that overcome the shortcomings of existing approaches.

BRIEF DESCRIPTION OF THE DRAWINGS

References will be made to embodiments of the disclosure, examples of which may be illustrated in the figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

Figure ("FIG.") 1 illustrates exemplary depth estimates from a convolutional spatial propagation network (CSPN), according to various embodiments of the present disclosure.

DETAILED DESCRIPTION OF EMBODIMENTS

Figure 1:
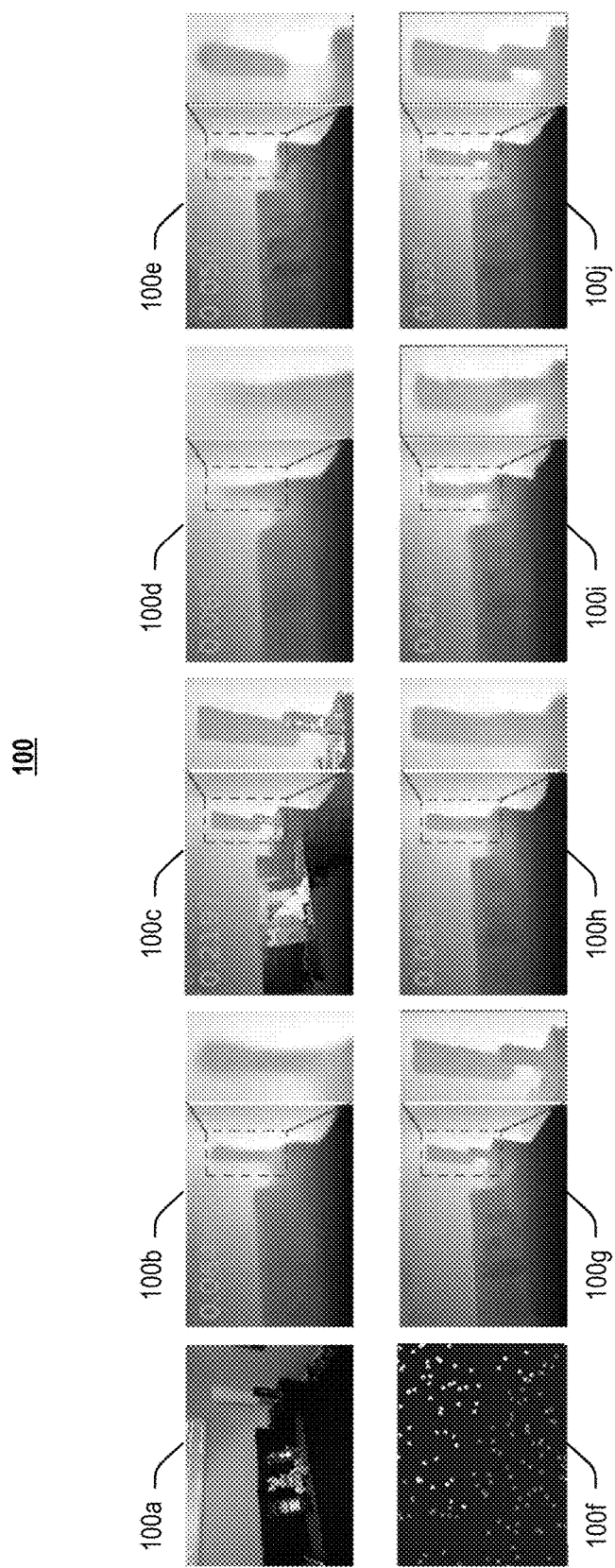

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

In this document, the term "prior" refers to prior knowledge, including human knowledge. "Online" refers to a dependency on past and current events, as compared to a dependency on future events.

A. General Introduction

Presented herein are convolutional spatial propagation networks (CSPN), where the depths at all pixels may be updated simultaneously within a local convolutional context. The long range context may be obtained through a recurrent operation. FIG. 1 illustrates exemplary depth estimates from a CSPN, according to various embodiments of the present disclosure. 100a shows an input image. 100b illustrates depth using an approach described by Ma et al. in "Sparse-to-dense: Depth prediction from sparse depth samples and a single image." ICRA (2018). 100c illustrates depth after bilateral filtering is applied. 100d illustrates a refined depth map output by a spatial propagation network (SPN) using an approach described by Liu et al. in "Learning affinity via spatial propagation networks" In: Advances in Neural Information Processing Systems. (2017) 1519-1529. 100e illustrates a refined depth map output by a CSPN according to various embodiments of the present disclosure. 100f shows 500 sparse depth samples. 100g shows Ground Truth. 100h illustrates a depth map output by a CSPN according to various embodiments of the present disclosure. 100i shows refined a depth map output by an SPN with depth sample. 100j illustrates a refined depth map output by a CSPN with depth sample, according to various embodiments of the present disclosure. The corresponding RMSE values placed at the left-top corner of each predicted depth map.

100e illustrates an exemplary depth map that has been estimated using a CSPN according to embodiments of the disclosure. As shown, depth map 100e is more accurate than the refined depth map output after bilateral filtering (100c) or output by an SPN (100d). Experimental results, discussed in Sec. D, demonstrate that embodiments that utilize a parallel update scheme achieve significant performance improvements in both speed and quality when compared to serial schemes such as SPN.

Practically, extracting depth from a single image is still an ill-posed problem that is under research, it also attracts the interests from industry that jointly considers depth from devices such as light detection and ranging (LiDAR) or stereo cameras. Embodiments presented herein extend CSPN to depth estimation tasks to various scenarios, e.g., depth completion with sparse depth collected from LiDAR, and stereo matching from a pair of images. In certain embodiments, by adjusting the manner in which affinity is learned, significantly improvements over existing methods are achieved.

Specifically, depth completion, a.k.a. sparse-to-dense depth conversion, is the task of converting sparse depth samples to a dense depth map given a corresponding image. This task may be used in a wide range of applications, such as in robotics and autonomous vehicles that oftentimes acquire depth perception through LiDAR, which usually generates sparse but accurate depth data. By combining the sparse measurement data with images, a full-frame dense depth map may thus be generated. In embodiments, the following requirements may be considered: (1) the recovered dense depth map should align with structures in the image; (2) the depth values associated with sparse samples should be preserved, since these values usually stem from a reliable sensor; and (3) the transition between sparse depth samples and their neighboring depths should be smooth and unnoticeable. In order to satisfy those requirements, in embodiments, first, mirror connections may be added based on an existing network. As illustrated in 100h, this generates a more accurate depth map. In embodiments, the propagation may be embedded into an SPN, e.g., in order to preserve the depth values at sparse points. As shown in 100i, this may generate more details and result in a lower error rate than an SPN that does not utilize depth samples (see 100d). Finally, as depicted in 100j, using a CSPN according to embodiments of the present disclosure instead of an SPN yields the best results. As can be seen, the recovered depth map, even with only 500 depth samples, produces more accurately estimated scene layouts and scales.

On the other hand, stereo matching estimates a disparity d for each pixel in the reference image. Specifically, for pixel (x, y) in the reference image, if its corresponding disparity is $d_{x,y}$, then the depth of this pixel could be calculated by $f*B/d_{(x,y)}$, where f is the camera's focal length and B is the distance between two camera centers. Current methods for solving this problem also rely on the development of deep networks. For example, GCNet learns to incorporate geometrical context directly from the data, employing 3D convolutions (3DConv) over height×width×disparity dimensions by separating the continuous disparity to discretized disparity valued space, yielding an end-to-end training system with results that have better recovered scene structure. PSMNet adopts a similar idea, while inducing extensions at scale space by using spatial feature pooling at the end of the feature encoder and uses multi-scale outputs from stacked hourglass networks with 3DConv. As discussed in detail in Sec. C.3, by extending spatial propagation from a 2D CSPN to a 3D CSPN, information can also propagate along the disparity value space and scale space, thus, yielding more accurate estimated results with more details.

To validate the presented systems and methods on different tasks, experiments use the NYU v2 benchmark for single image depth estimation and depth completion. Various embodiments perform significantly better (relative 30% improvement in most key measurements) when compared to existing deep learning based methods. In addition, various embodiments yield a 2-5 times higher acceleration when compared to SPN.

It is noted that although the systems and methods using a CSPN presented herein are discussed with reference to only two depth estimation tasks, it is understood that the CSPN may equally be applied to other tasks, such as image segmentation and enhancement.

Various embodiments, make the following contributions:

(1) CSPNs that are more efficient and accurate for depth estimation than known propagation strategies, without sacrificing the theoretical guarantee;

(2) extending CSPNs to the task of converting sparse depth samples to dense depth map by using provided sparse depths into the propagation process. This ensures that the sparse input depth values are preserved in the final depth map. Real-time operation is well-suited for robotics and autonomous driving applications, where sparse depth measurement from LiDAR can be fused with image data; and (3) extending 2D CPSN to 3D for stereo matching, which explores the correlation within both discrete disparity space and scale space. This aids the recovered stereo depth to generate more details and to avoid error matching from noisy appearance caused by sunlight, shadow, and similar effects.

B. Related Work

Estimating depth and prediction enhancement/refinement by spatial propagation from a single image have long been center problems for computer vision and robotics.

Single View Depth Estimation Via CNN and Conditional Random Field (CRF).

Deep neural networks (DCN) developed in recent years provide strong feature representation for per-pixel depth estimation from a single image. Numerous algorithms have been developed through supervised methods, semi-supervised methods or unsupervised methods, some utilizing skip and mirror connections. Other approaches attempt to further improve the estimated details by appending a conditional random field (CRF) and joint training. However, the affinity for measuring the coherence of neighboring pixels is manually designed based on color similarity or intervening contour with RBF kernel.

Depth Enhancement.

Traditionally, depth output can be also efficiently enhanced with explicitly designed affinity through image filtering, or data-driven ones through total variation (TV) and learning to diffuse by incorporating more priors into diffusion partial differential equations (PDEs). However, due to the lack of an effective learning strategy, these methods are not suitable for large-scale complex visual enhancement. Recently, deep learning based enhancement is attracting significant attention and yields impressive results on super-resolution of both images and depths. The network takes low resolution inputs and outputs high-resolution results, and it is trained end-to-end where the mapping between input and output is implicitly learned. However, these methods are only trained and experimented with perfect correspondent ground-truth low-resolution and high-resolution depth maps and often a black-box model. In embodiments presented herein, both the input and ground truth depth may be non-perfect, e.g., depths may be obtained from low-cost LiDAR or a network, thus, an explicit diffusion process to guide the enhancement such as SPN is necessary.

Learning Affinity for Spatial Diffusion.

Learning affinity matrix with deep CNN for diffusion or spatial propagation receives high interests in recent years due to its theoretical supports and guarantees. Some approaches have trained a deep CNN to directly predict the entities of an affinity matrix, which demonstrates good performance on image segmentation. However, the affinity is followed by an independent non-differentiable solver of spectral embedding; it cannot be supervised end-to-end for the prediction task. Others introduced a random walk network that optimizes the objectives of pixel-wise affinity for semantic segmentation. Nevertheless, their affinity matrix needs additional supervision from ground-truth sparse pixel pairs, which limits the potential connections between pixels. Yet others have tried to explicit model an edge map for domain transform to improve the output of neural network.

SPN converts the learning of a large affinity matrix for diffusion to learning a local linear spatial propagation, yielding a simple and effective approach for output enhancement. However, as previously discussed in Sec. A above, depth enhancement commonly requires local context, it might not be necessary to update a pixel by scanning the whole image. In contrast, embodiments that use a CSPN are shown to be more efficient and to provide significantly better results, as will be discussed in greater detail in Sec. D below.

Depth Estimation with Given Sparse Samples.

The task of sparse depth to dense depth estimation was introduced in robotics due to its wide application for enhancing 3D perception. Different from depth enhancement, the provided depths are usually from low-cost LiDAR or one line laser sensors, yielding a map with valid depth in only few hundreds of pixels, as illustrated in 100f in FIG. 1. Some approaches treat a sparse depth map as an additional input to a ResNet based depth predictor, producing superior results when compared to the depth output from a CNN with solely image input. However, the output results are still blurry and do not align well with given structures in the input image, as discussed above in the Background section. In contrast, embodiments directly embed the sampled depth into the diffusion process and satisfy the requirements mentioned in Sec. A.

Some existing approaches directly convert sparse 3D points to dense ones without image input, but the density of sparse points must be high enough to reveal the scene structure, which may not be available in for various embodiments disclosed herein.

Stereo with CNNs.

Stereo depth estimation has long been a central problem in computer vision. Traditionally, Scharstein and Szeliski provide a taxonomy of stereo algorithms in four steps: matching cost calculations, matching cost aggregation, disparity calculation and disparity refinement.

CNNs were first introduced to stereo matching to replace the computation of the matching cost. One approach showed that by using CNNs, matching could be more robust and achieve state of the art results over KITTI Stereo benchmarks. However, the networks are shallow and need postprocessing for refinement. Other methods increase computational efficiency, or match cost accuracy with stronger network and confidence predictions. Some works focus on post-processing by incorporating top-down knowledge from objects such as Displets.

This can be applied to study of stereo matching networks to develop a fully learnable architecture without manually designed processing. DispNet, FlowNet are designed to find 2D optical flow by inserting two corresponding frames that can be easily extended to stereo matching by limiting the searching within a disparity line. However, these methods do not fully take advantage of the limited range for stereo matching. In order to perform densely model per-pixel disparity matching, GCNet proposes to generate a 3D cost volume of size height×width×disparity by densely comparing the feature at pixel (i, j) from a reference image to all possible matching pixels within disparity line in the target image. The network can figure out the best matching disparity through a soft-argmin operation. PWCNet follows a similar idea while having cost volume calculated within a local region within size of d×d. PSMNet embraces the experience of semantic segmentation studies, which exploits scale space through pyramid spatial pooling and hourglass networks for capturing global image context, yielding better results than GCNet. Both GCNet and PSMNet benefit from exploring a new dimension, i.e., disparity value space and scale space, respectively. As discussed further below, embodiments presented herein extend 2D CSPN to 3D CSPN, which considers modeling the relation with diffusion along a new dimension and produces more robust results.

Spatial pyramid for hierarchical context. Spatial pyramid pooling (SPP) was proposed to increase the empirical receptive field of a fully convolutional network and demonstrated to be effective in the study of both semantic segmentation and depth estimation, e.g., PSMNet. Various embodiments explore scale space for a dense prediction model and spatial pyramid pooling (SPP) to provide insight into proposed models. In embodiments, parameters for SPP form a scale space that is manually set and experimentally determined based on existing datasets. In embodiments, a CSPN with 3D convolution learns the affinity for fusing a proposed scale space, which softly discovers the proper scale of context for the network. Experiments demonstrate that such a strategy effectively improves depth estimation results when compared to PSMNet. It is contemplated that presented embodiments may equally be applied to other tasks, such as semantic segmentation.

C. Embodiments

An CSPN module is introduced that may be an anisotropic diffusion process and the diffusion tensor may be learned through a deep CNN directly from a given image. The module may be applied to various tasks discussed herein.

1. Convolutional Spatial Propagation Network Embodiments

Given a depth map $D_o \in R^{m \times n}$ that is output from a network, and an image $X \in R^{m \times n}$, one task is to update the depth map to a new depth map $D_n$ within N iteration steps, which first reveals more details of the image and second improves the per-pixel depth estimation results.

Figure 2A:
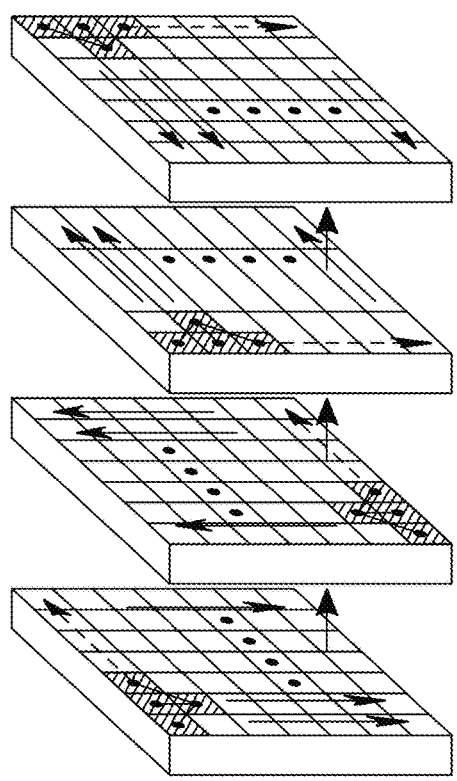
FIG. 2A illustrates a propagation process using an existing SPN.
Figure 2C:
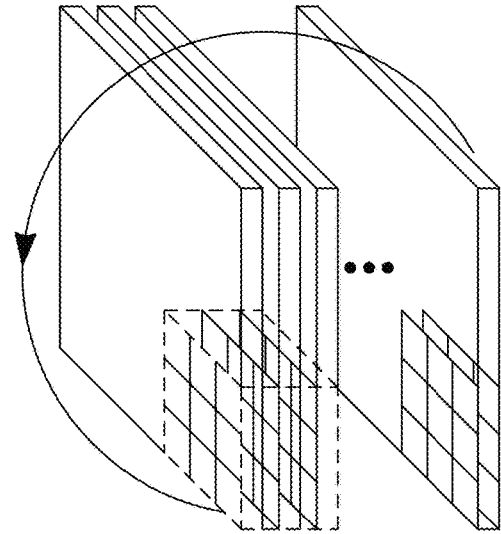
FIG. 2C illustrates an updating operation in a 3D spatial propagation process using a 3D CSPN according to various embodiments of the present disclosure.
Figure 2B:
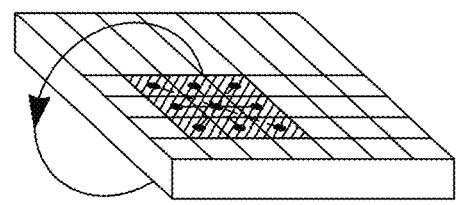
FIG. 2B illustrates an updating operation in a 2D spatial propagation process using a CSPN according to various embodiments of the present disclosure.

FIG. 2B illustrates an updating operation in a 2D spatial propagation process using a CSPN according to various embodiments of the present disclosure. Formally, without loss of generality, the depth map $D_o \in R^{m \times n}$ can be embedded to some hidden space $H \in R^{m \times n \times c}$. The convolutional transformation functional with a kernel size of k for each time step t may be written as, $$H_{i,j,t+1} = \sum_{a,b=-(k-1)/2}^{(k-1)/2} \kappa_{i,j}(a, b) \odot H_{i-a,j-b,t} \quad \text{(Eq. 1)}$$

where $$\kappa_{i,j}(0, 0) = 1 - \sum_{a,b,a,b \neq 0} \kappa_{i,j}(a, b),$$

$$\kappa_{i,j}(a, b) = \frac{\hat{\kappa}_{i,j}(a, b)}{\sum_{a,b} |\hat{\kappa}_{i,j}(a, b)|}$$

where the transformation kernel $\hat{\kappa}_{i,j} \in R^{m \times n \times c}$ is the output from an affinity network, which is spatially dependent on the input image. The kernel size k is usually set as an odd number so that the computational context surrounding pixel (i, j) is symmetric. ⊙ represents an element-wise product. In embodiments, kernel weights may be normalized between the range of (−1, 1) so that the model may be stabilized and can converge by satisfying the condition $\Sigma_{a,b,a,b \neq 0} |\kappa_{i,j}(a, b)| \leq 1$. This iteration may be performed N steps to reach a stationary distribution.

Correspondence to Diffusion Process with a Partial Differential Equation (PDE).

It may be shown that the CSPN holds desired properties of SPN. Formally, the propagation in Eq. (1) may be rewritten as a process of diffusion evolution by first performing column-first vectorization of feature map H to $H_v \in R^{mn \times c}$.

$$H_v^{t+1} = \begin{bmatrix} 1-\lambda_{0,0} & \kappa_{0,0}(1,0) & \cdots & 0 \\ \kappa_{1,0}(-1,0) & 1-\lambda_{1,0} & \cdots & 0 \\ \vdots & \vdots & \ddots & \vdots \\ \vdots & \cdots & \cdots & 1-\lambda_{m,n} \end{bmatrix} = GH_v^t \quad \text{(Eq. 2)}$$

where $\lambda_{i,j} = \Sigma_{a,b} \kappa_{i,j}(a,b)$ and G is a mn×mn transformation matrix. The diffusion process expressed with a partial differential equation (PDE) may be derived as follows, $$H_v^{t+1} = GH_v^t = (I-D+A)H_v^t$$

$$H_v^{t+1} - H_v^t = -(D-A)H_v^t$$

$$\partial_t H_v^{t+1} = -LH_v^t \quad \text{(Eq. 3)}$$

where L is the Laplacian matrix, D is the diagonal matrix containing the $\lambda_{i,j}$, and A is the affinity matrix which is the off diagonal part of G.

Unlike approaches that scan the whole image in four directions (FIG. 2A) sequentially, CSPN, in embodiments, propagates a local area towards all directions at each step (FIG. 2B) simultaneously, i.e., with k×k local context, while larger context is observed when recurrent processing is performed, and the context acquiring rate is on the order of O(kN).

Embodiments use the convolutional operation due to that it may be efficiently implemented, e.g., through image vectorization, yielding real-time performance in depth refinement tasks.

Principally, CSPN may also be derived from loopy belief propagation with sum-product algorithm. However, since embodiments adopt linear propagation, which is efficient, while just a special case of pairwise potential with L2 reconstruction loss in graphical models. Therefore, to make it more accurate, the strategy may be called convolutional spatial propagation in the field of diffusion process.

Complexity Analysis.

As formulated in Eq. (1), a CSPN takes the operation of convolution, where the complexity of using Compute Unified Device Architecture (CUDA) with GPU for one step CSPN is $O(\log_2(k^2))$, where k is the kernel size. This is because CUDA uses parallel sum reduction, which has logarithmic complexity. In addition, in embodiments, a convolution operation may be performed parallel for all pixels and channels, which has a constant complexity of O(1). Therefore, performing N-step propagation, the overall complexity for CSPN is $O(\log_2(k^2)/N)$, which is independent of image size (m, n).

SPN adopts scanning row/column-wise propagation in four directions. Using k-way connection and running in parallel, the complexity for one step is $O(\log_2(k))$. The propagation needs to scan full image from one side to another, thus the complexity for SPN is $O(\log_2(k))(m+n))$. Although this is more efficient than an existing densely connected CRF, whose implementation complexity with permutohedral lattice is O(mnN), in embodiments, $O(\log_2(k^2)/V)$ is more efficient since the number of iterations N is much smaller than the size of image m, n. As discussed in Sec. D, experiments with k=3 and N=12 show that CSPN can outperform SPN with a rather large margin (relative 30%) in accuracy, demonstrating both efficiency and effectiveness of embodiments disclosed herein.

2. CSPN for Depth Completion Embodiments

In embodiments, an additional sparse depth map Ds (400b in FIG. 4) may be used to help estimate a depth map, e.g., from an RGB image. In embodiments, a sparse set of pixels is set with depth values from one or more depth sensors, which may be used to guide the propagation process.

a) Spatial Propagation with Sparse Depth Samples

Similarly, a sparse depth map $Ds=\{d_{i,j}^s\}$ may be embedded into a hidden representation $H^s$, and the updating equation of H may be written by simply adding a replacement step after performing Eq. (1), $$H_{i,j,t+1}=(1-m_{i,j})H_{i,j,t+1}+m_{i,j}H_{i,j}^s \quad (Eq. 4)$$

where $m_{i,j}=I(d_{i,j}^s>0)$ is an indicator for the availability of sparse depth at pixel (i,j).

In embodiments, in this way, this guarantees that refined depths have the exact same value at the valid pixels in the sparse depth map. Additionally, information may be propagated from those sparse depths to their surrounding pixels such that the smoothness between the sparse depths and their neighbors are maintained. In embodiments, due to the diffusion, the final depth map may be well aligned with image structures. This fully satisfies the desired three properties for this task previously discussed in Sec. A.

In addition, in embodiments, this process may use the diffusion process with PDE, where the transformation matrix may be built by simply replacing the rows satisfying $m_{i,j}=1$ in G (Eq. (2)), which correspond to sparse depth samples, by $e_{i+j+m}^T$. Here, $e_{i+j+m}$ is a unit vector with the value at i+j*m as 1. Therefore, the summation of each row is still 1, and the stabilization still holds in this case.

Figures 3A, 3B:
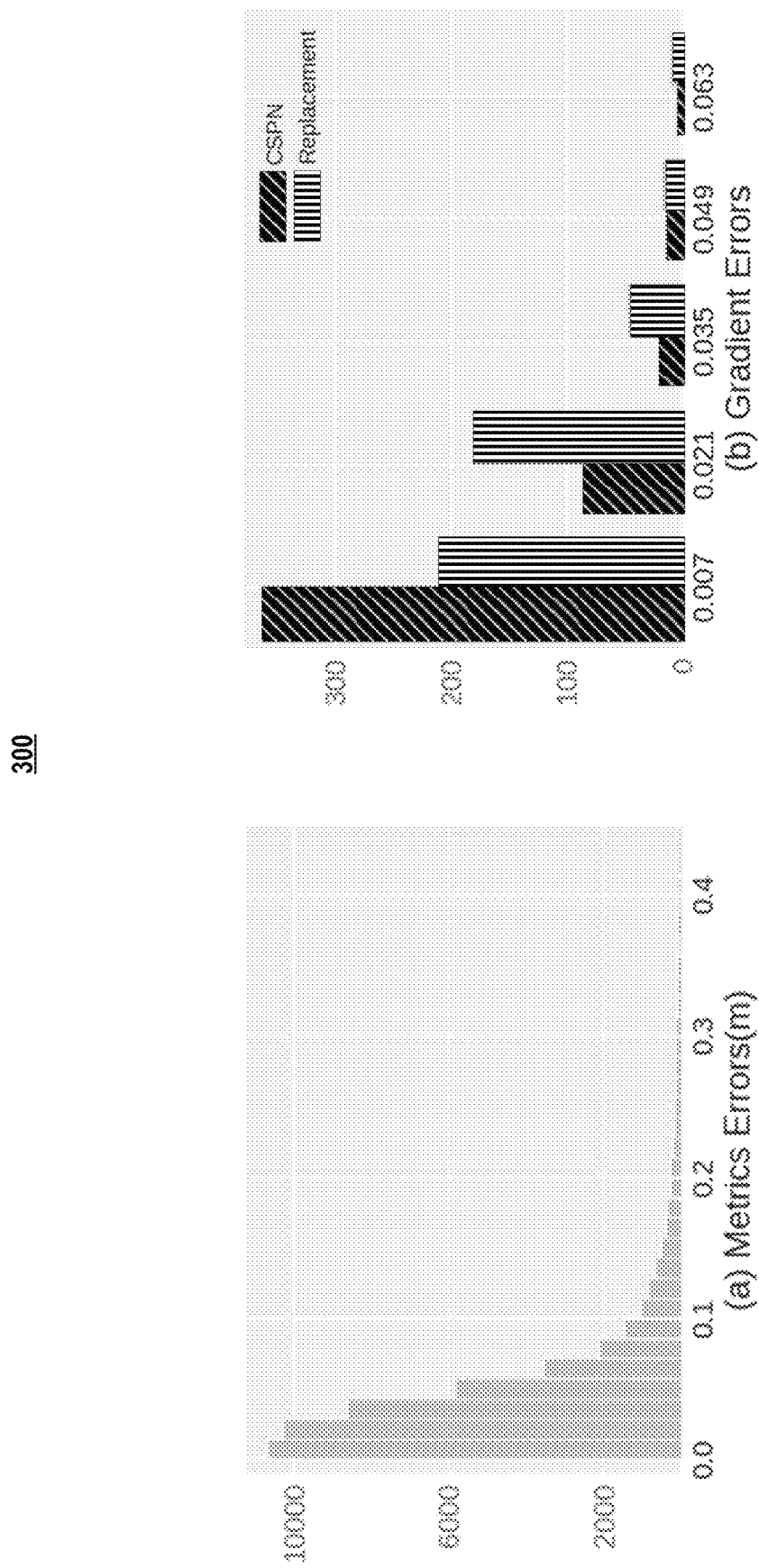
FIG. 3A shows a histogram of root mean square error (RMSE) with depth maps at given sparse depth points.
FIG. 3B is a comparison of gradient error between depth maps using sparse depth replacement according to FIG. 3A

FIG. 3A shows a histogram of RMSE with depth maps at given sparse depth points. FIG. 3B is a comparison of gradient error between depth maps using sparse depth replacement according to FIG. 3A and results using a CSPN according to embodiments disclosed herein. The vertical axes show the count of pixels.

Figure 4:
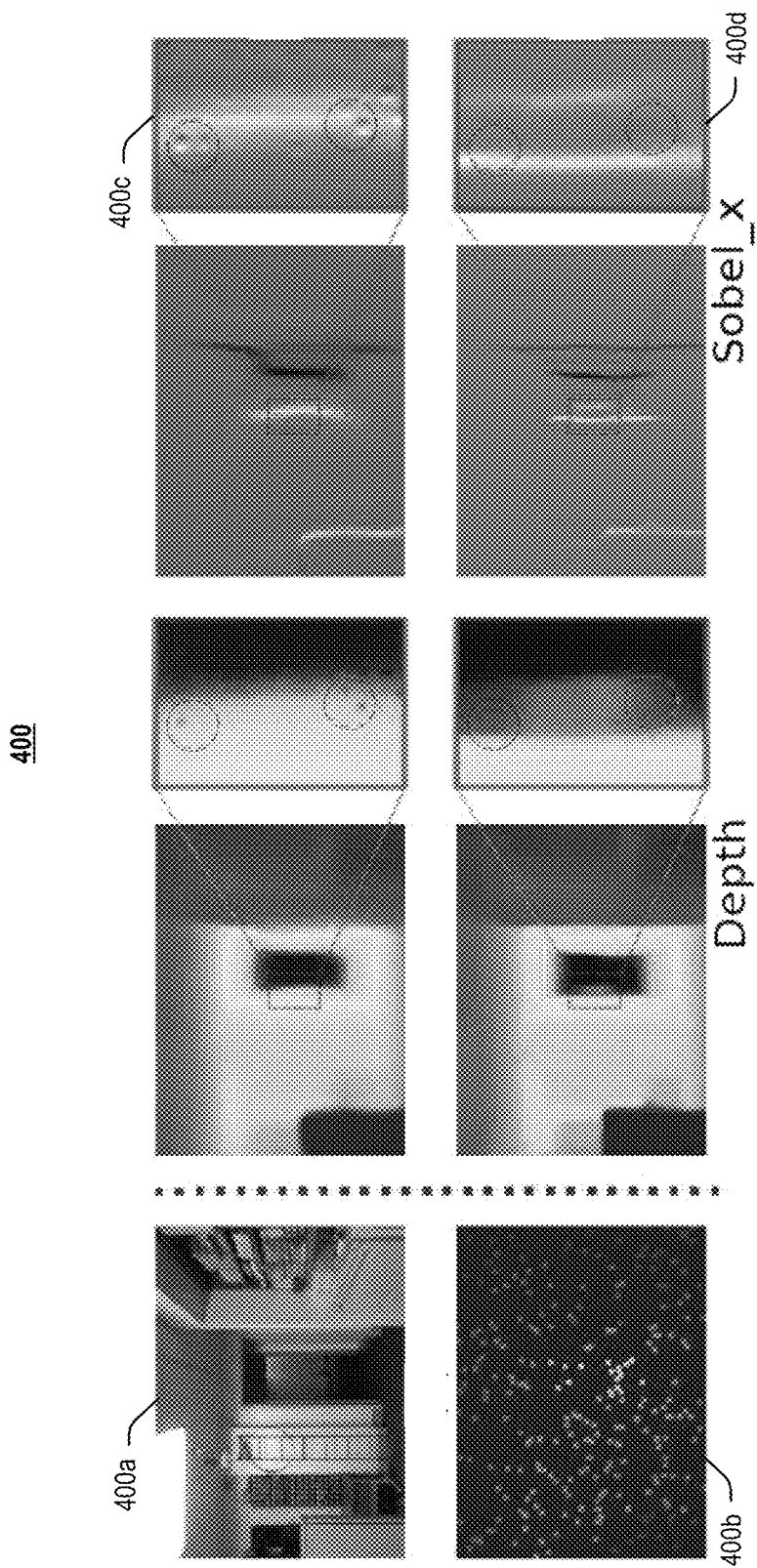
FIG. 4 is a comparison of the depth map using sparse depth replacement with CSPN according to various embodiments of the present disclosure with respect to smoothness of depth gradient at sparse depth points.

Embodiments have several advantages over existing sparse-to-dense methods. The histogram in FIG. 3A plots depth displacement from ground truth at given sparse depth pixels from the output of an existing network. As FIG. 3A illustrates, the accuracy of sparse depth points cannot be preserved, and some pixels may have a relatively large displacement, e.g., 0.2 m, indicating that directly training a CNN for depth prediction does not preserve the value of real sparse depths provided. To acquire such property, one may simply replace the depths from the outputs with provided sparse depths at those pixels, however, it yields non-smooth depth gradient with respect to surrounding pixels. In FIG. 4, such an example (400c) is plotted at right of the figure. The Sobel gradient of the depth map along the x-direction is computed, where it can be seen that the gradients surrounding pixels with replaced depth values are non-smooth. This is statistically verified in FIG. 3B by using 500 sparse samples. The bars labeled "replacement" are the histogram of gradient error at sparse pixels by comparing the gradient of the depth map with sparse depth replacement and of ground truth depth map. As can be seen, the difference is significant, ⅔ of the sparse pixels have large gradient error. On the other hand, bars labeled "CSPN" in FIG. 3B illustrate that, in embodiments, the average gradient error is much smaller, and most pixels have zero error.

FIG. 4 is a comparison of an existing depth map using sparse depth replacement with CSPN according to various embodiments of the present disclosure with respect to smoothness of depth gradient at sparse depth points. 400a shows an input image. 400b shows the sparse depth points. 400d illustrates a depth map using a CSPN with sparse depth points, according to embodiments disclosed herein. The zoomed in regions highlight the differences. As 400d, shows, the depth gradients surrounding sparse pixels are smooth and close to ground truth, which demonstrates the effectiveness of the propagation scheme disclosed herein.

b) Architecture Estimating Single Image Depths

Figure 5:
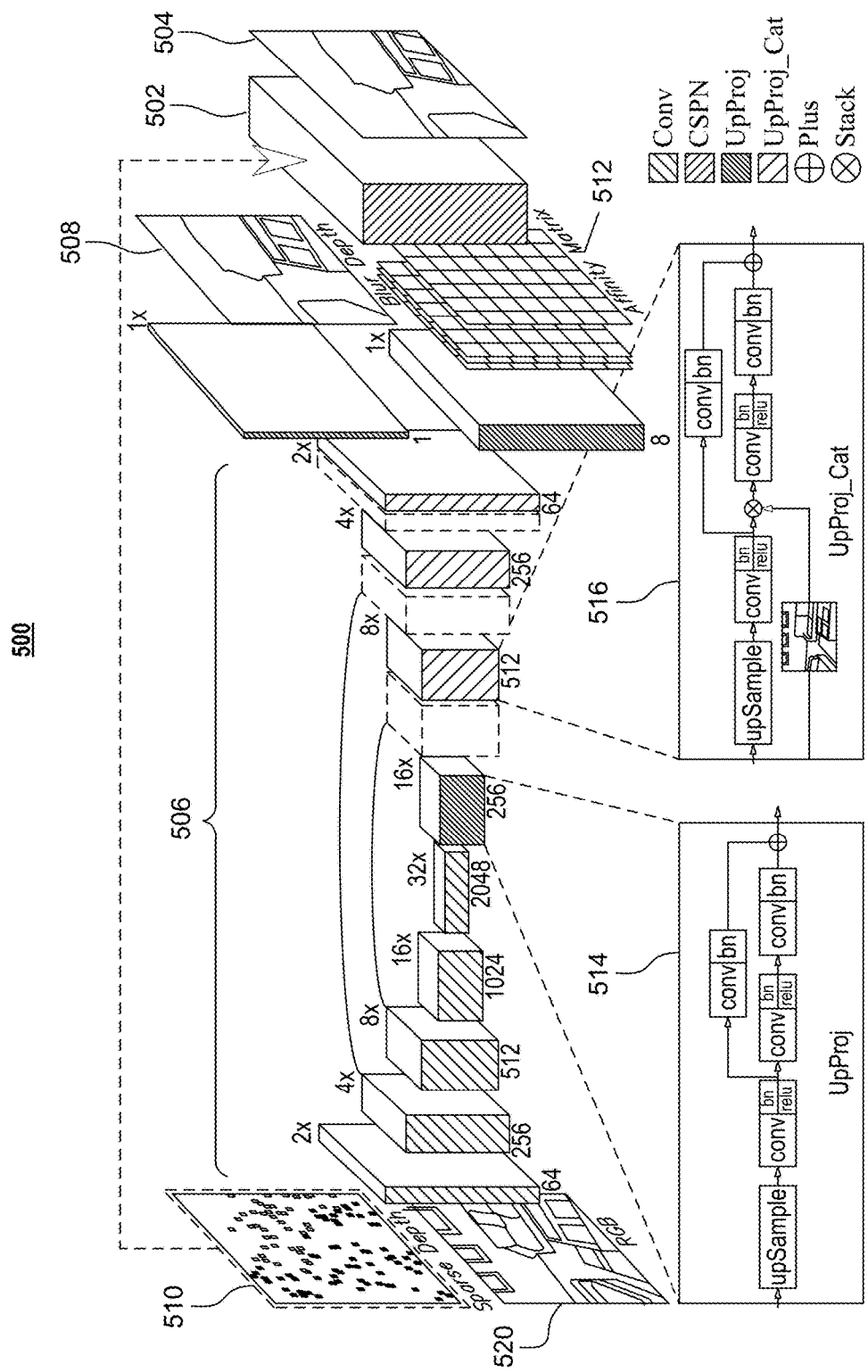
FIG. 5 illustrates an exemplary architecture according to various embodiments of the present disclosure.

FIG. 5 illustrates an exemplary architecture according to embodiments of the disclosure (best viewed in color). Architecture 500 comprises CSPN 502, CNN 506, blur depth 508, output dense depth map 504, affinity matrix 512, input image 520. In embodiments, architecture 500 comprises mirror connections for depth estimation via transformation kernel prediction with CSPN 502. In embodiments, architecture 500 comprises sparse depth 510 as an optional input that may be embedded into CSPN 502 to guide the depth refinement.

In embodiments, end-to-end network architecture 500 may be used to predict both the transformation kernel and the depth value, which may be the inputs to a CSPN for depth refinement. As depicted in FIG. 5, CSPN layer 502 may output dense depth map 504. In embodiments, to predict the transformation kernel κ in Eq. (1), rather than building a new deep network for learning affinity as some authors have proposed, embodiments branch an additional output from the given network, which shares the same feature extractor with the depth network. In embodiments, this helps to save memory and time cost for joint learning of both depth estimation and transformation kernel prediction.

In embodiments, learning of affinity is dependent on fine-grained spatial details of input image 520. However, spatial information is weakened or lost with the downsampling operation during the forward process of the ResNet in some approaches. Thus, embodiments add mirror connections similar to a U-shape network by directed concatenating the feature from encoder to up-projection layers as illustrated by "UpProj_Cat" layer 516 shown in FIG. 5. In embodiments, affinity matrix 512 may be output by CNN 506 or by a separate CNN not shown in FIG. 5.

One skilled in the art will appreciate that the end-points of mirror connections should be carefully selected. Experiments have shown that out of three positions to append the connection, i.e., after cony, after bn, and after relu as shown by "UpProj" layer 514, the last position may provide the best results by validating with the NYU v2 dataset (Sec. D.2). In embodiments, not only the depth output from the network is better recovered, but also the results after the CSPN are additionally refined, as discussed further below in Sec. D. Embodiments use the same training loss an existing model, yielding an end-to-end learning system.

3. 3D CSPN Stereo Matching Embodiments

Various embodiments use CSPN for stereo depth estimation. FIG. 2C illustrates an updating operation in a 3D spatial propagation process using a 3D CSPN according to various embodiments of the present disclosure. Considering a prediction from PSMNet with maximum disparity, d, the output map from pair a stereo image pair has a shape of Do ∈ $R^{d \times h \times w}$, where h and w are the feature height and width, respectively. In embodiments, the output map may be updated to a new map, Dn, e.g., within N iteration steps, where diffusion along three dimensions may be jointly performed. Advantageously, this may yield a prediction that reveals better details and structures inside the image. Formally, the depth in the formation for 3D CSPN may be written as, $$H_{i,j,l,t+1} = \sum_{a,b,c=-(k-1)/2}^{(k-1)/2} \kappa_{i,j,l}(a, b, c) \odot H_{i-a,j-b,l-c,t} \quad \text{(Eq. 5)}$$

where $$\kappa_{i,j,l}(a, b, c) = \frac{\hat{\kappa}_{i,j,l}(a, c, b)}{\sum_{a,b,c|a,b,c \neq 0} |\kappa_{i,j,l}(a, b, c)|},$$

$$\kappa_{i,j,l}(0, 0, 0) = 1 - \sum_{a,b,c|a,b,c \neq 0} \kappa_{i,j,l}(a, b, c).$$

In embodiments, this adds a new dimension for propagation when compared to Eq. (1). Advantageously, the original theoretical properties are well maintained by verification over all three dimensions. As discussed in greater detail below, in embodiments, such an operation may be performed with respect to both disparity value space at the end of PSMNet, and scale space for spatial pyramid pooling in the middle of the network.

a) Architecture for Stereo Matching

Figure 6:
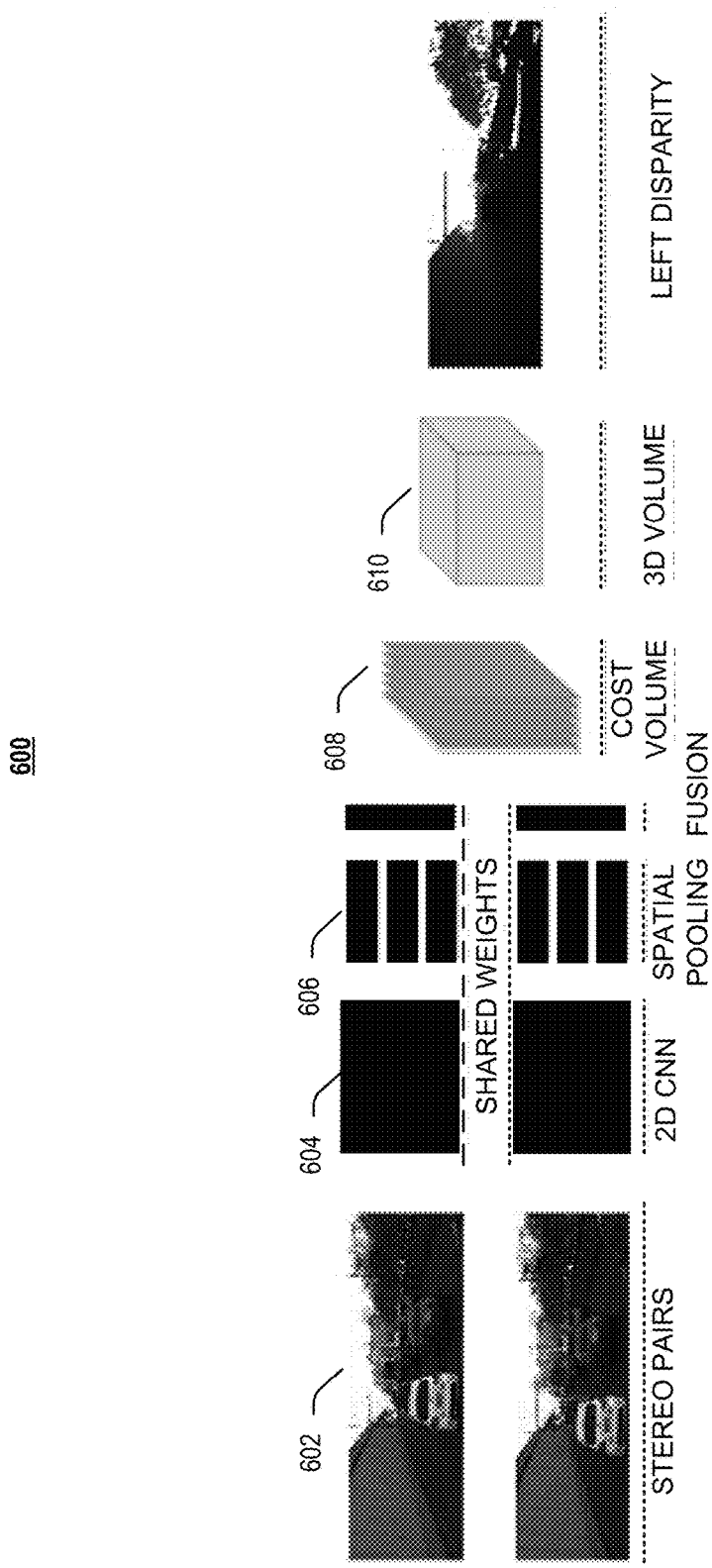
FIG. 6 illustrates an exemplary architecture for stereo depth estimation via transformation kernel prediction with 3D CSPN according to various embodiments of the present disclosure.

FIG. 6 illustrates an exemplary architecture for stereo depth estimation via transformation kernel prediction with 3D CSPN according to various embodiments of the present disclosure. In embodiments, the full network architecture in FIG. 6 comprises a stereo image pair (e.g., left and right) images 602 that are input into two weight-sharing CNNs 604 yielding corresponding feature maps, a spatial pooling module 606 for feature harvesting, e.g., by concatenating representations from sub-regions with different sizes. The produced feature maps may be used to form 4D cost volume 608 that, in embodiments, may be fed into 3D module 610 for disparity regression.

3D CSPN Over Disparity and Scale Space.

Figure 7:
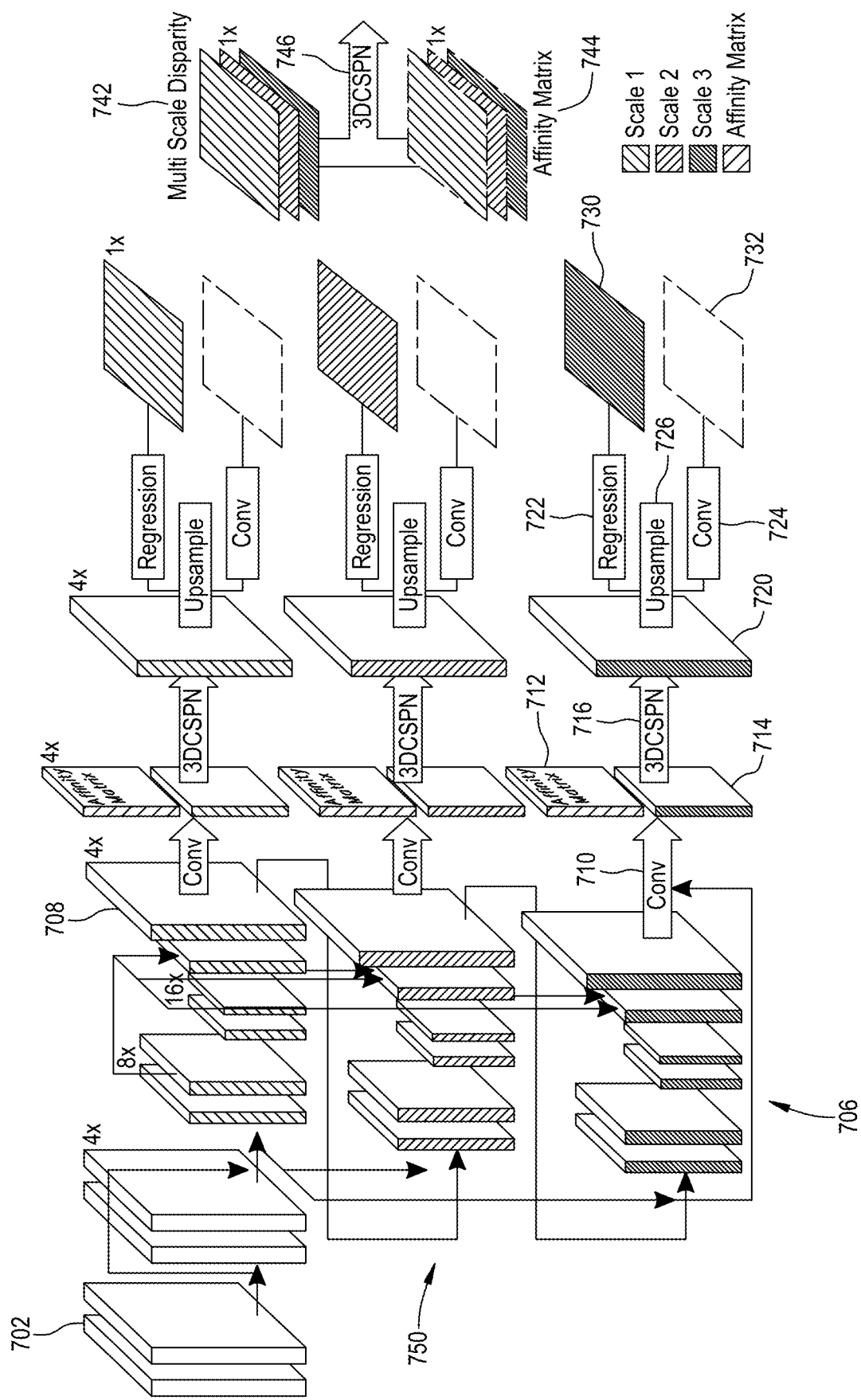
FIG. 7 illustrates details of an exemplary 3D module shown in FIG. 6.

FIG. 7 illustrates details of an exemplary 3D module shown in FIG. 6 to clarify the architecture we applied for disparity regression. FIG. 7 comprises convolution layer 702, hourglass network 706, disparity volume 708, convolution layer 710, 3D affinity matrix 712, disparity volume 714, 3D CSPN 716, updated disparity volume 720, regression 722, convolution 724, upsampling layer 726, 2D disparity map 730, 2D affinity matrix 732, 4D multi-scale disparity stack 742, 3D affinity matrix stack 744, 3D CSPN 746, and stages (e.g., 750). It is noted that in FIG. 7 the downsample rate with respect to image size is shown at the right top corner of each block, e.g., "4×" means that the size of the feature map is h/4×w/4, where h×w is the image size.

In PSMNet, three predicted disparity volumes each having a size of d/4×h/4×w/4×1 are output from a stacked hourglass network. In embodiments, d, h, w are the respective maximum disparity, height and width of the input image. Similar to the appending strategy of 2D CSPN for single image depth prediction in Sec. C.2, after disparity volume 714 at each stage 750, 3D CSPN 716 having a kernel size of k×k×k may be appended to combine contexts from neighboring pixels, where affinity matrix 712 is learned from the same feature block as the outputs. Then, upsampling, e.g., bilinear upsampling, may be applied to upsample disparity volume 720 to d×h×w×1 for disparity map regression 722, yielding an output with a shape of h×w×1.

In order to fuse disparity maps 730 from different stages 750, PSMNet manually sets the weight to average the outputs. In embodiments, disparity maps 730 may be concatenated into a 4D volume to obtain 4D multi-scale disparity stack 742 with size s×h×w×1, where s=3 is the number of disparity maps 730. Similarly, a 3D CSPN with kernel size as s×k×k may be performed to connect the multi-stage predictions, which is conceptually similar as attention models for multi-scale feature fusion. In embodiments, feature padding with size [0, 1, 1] may be used, such that the first dimension is reduced to 1 with one iteration and a single regressed disparity map with shape h×w×1 may be obtained for final depth estimation.

FIG. 8A-FIG. 8D illustrate different structures of context pyramid modules according to various embodiments of the present disclosure.

Spatial pyramid pooling as a special case of CSPN. In embodiments, stereo matching is improved by enhanced the spatial pyramid pooling (SPP) module as shown, e.g., in the architecture in FIG. 6. FIG. 8A shows an existing SPP module applied by PSMNet. In embodiments, given proper kernel size and convolution stride, SPP 800 may be treated as a special case of a CSPN. Formally, given a feature map with size of h×w and a target pooled feature map with size p×q, spatial pooling may compute the mean value within each parted grid having a size of h/p×w/q. In embodiments, this may be equivalent to one step CSPN (Eq. (1)) by setting both convolution kernel size and stride to h/p×w/q, and setting the values in pooling kernel κ(a, b) to be the same. However, since features may differently impact the final performance, in embodiments, such a pooling kernel κ(a, b) may be learned by using a CSPN for SPP module 800.

Figure 8B:
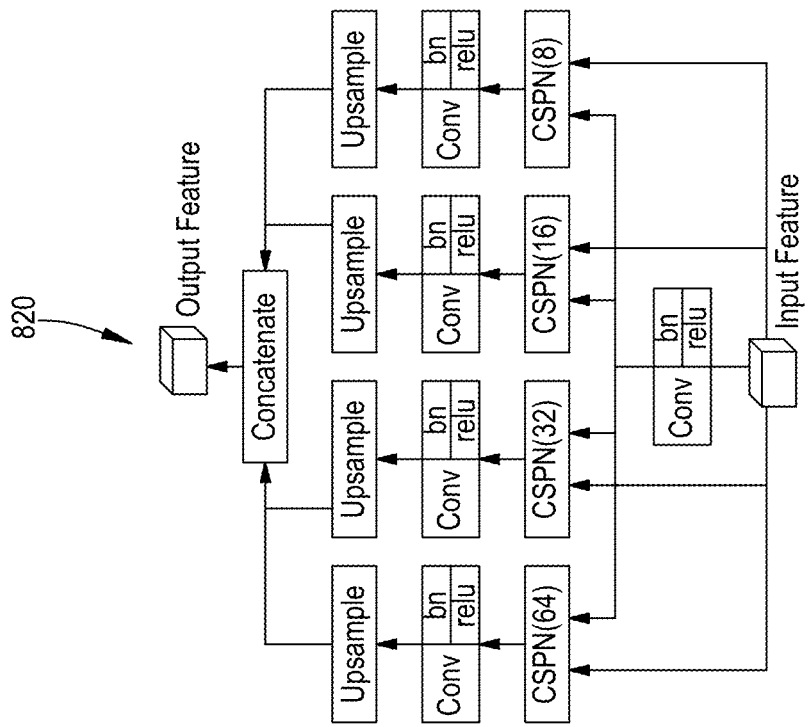
FIG. 8B illustrates a weighted SPP (WSPP) module using 2D CSPN with different kernel size and stride according to various embodiments of the present disclosure.
Figure 8A:
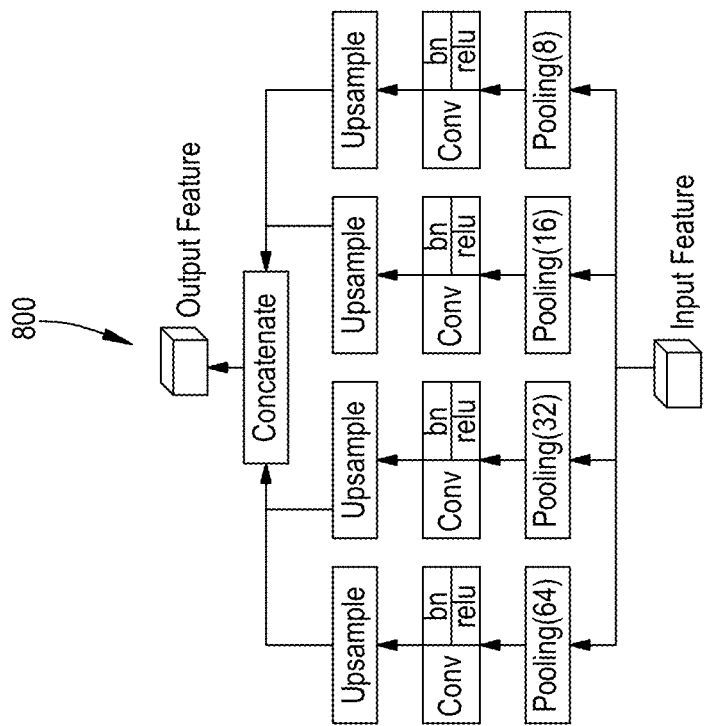
FIG. 8A shows an existing spatial pyramid pooling (SPP) module applied by PSMNet.

FIG. 8B illustrates a weighted SPP (WSPP) module using 2D CSPN with different kernel size and stride according to various embodiments of the present disclosure. As shown in FIG. 8B, an affinity matrix may be output from the same feature block for SPP 820, based on which a one-step 2D CSPN may be performed, yielding a pooled feature map with size p×q. Specifically, feature maps with target sizes of 64×64, 32×32, 16×16, and 8×8 may be adopted (FIG. 8A), and the feature maps may share the same network output for computing the pooling kernels. In other words, the network outputs a one-channel weight map with size h×w×1, and for each target size of pooled features, the weight map may be first partitioned to pooling regions, and the pooling kernel κ( ) may be computed within each region according to Eq. (1). This strategy is referred to herein as multi-scale feature computing as weighted spatial pyramid pooling (WSPP). Finally, feature maps from the layers of the spatial pyramid may be combined or fused. In embodiments, rather than directly concatenating the pooled features into a feature map with size h×w×lc, multi-stage disparity maps may be fused as illustrated in FIG. 8C.

Figure 8D:
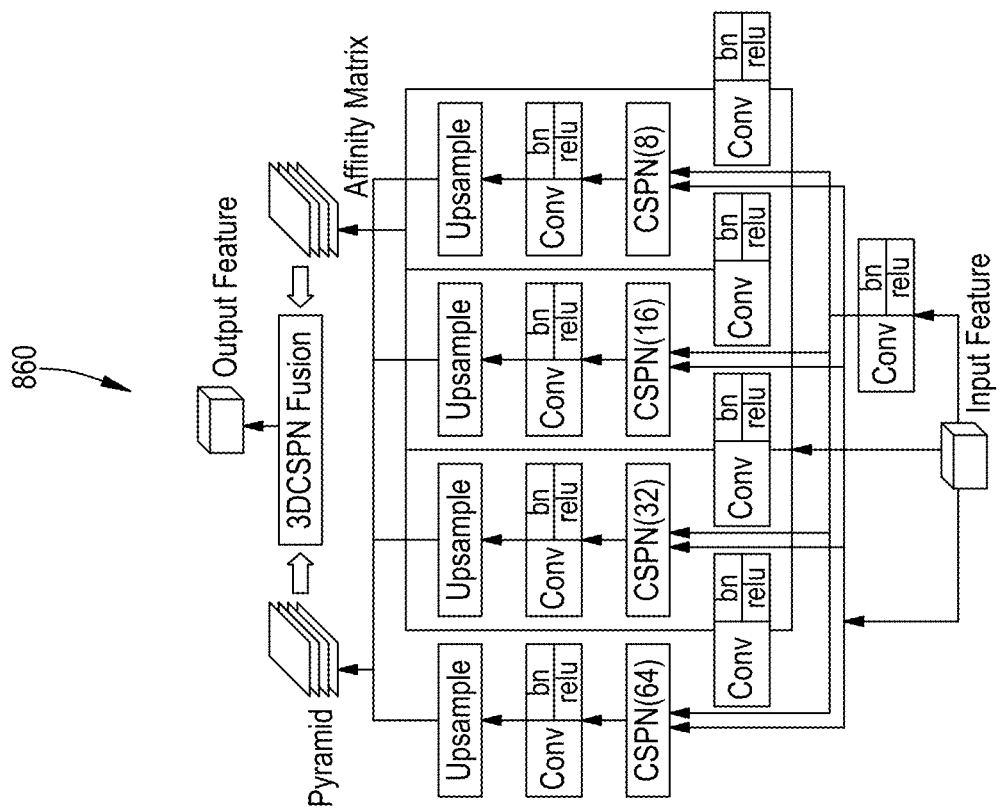
FIG. 8D illustrates a combined SPP module according to various embodiments of the present disclosure.
Figure 8C:
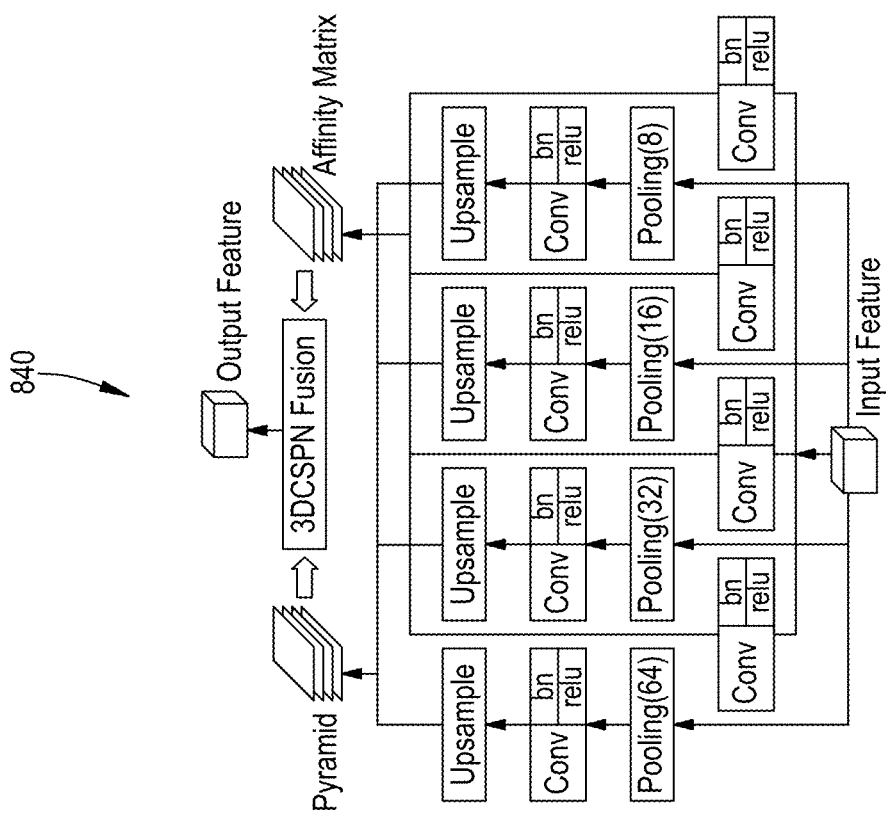
FIG. 8C illustrates a weighted spatial pyramid fusion (WSPF) using 3D CSPN according to various embodiments of the present disclosure.

FIG. 8C shows a weighted spatial pyramid fusion (WSPF) using 3D CSPN according to various embodiments of the present disclosure. In embodiments, the output spatial pyramid features may be concatenated into a 4D volume with size l×h×w×c and learn a transformation kernel with size of l×3×3, yielding a fused feature map with size h×w×c. In embodiments, this may be fed to a cost volume computation at later stages, as mentioned with respect to FIG. 6. In embodiments, l is the layer number of the spatial pyramid, and one independent branch may be used for computing the transformation kernel for each layer. This strategy may be referred to herein as weighted spatial pyramid fusion (WSPF).

In embodiments, a spatial pooling strategy may comprise a combination of WSPP and WSPF, as shown in FIG. 8D. FIG. 8D illustrates a combined SPP module according to various embodiments of the present disclosure, which produces a significant boost in performance compare to existing SPP modules.

In embodiments, ASPP may be used to replace SPP for multi-scale feature pooling without feature size reduction. Specifically, ASPP may use dilated convolution to obtain features within various context. In embodiments, CSPN may be performed in a similar manner of dilated convolution by learning a spatial dependent transformation kernel. As a result, in embodiments, ASPP may be extended to a weighted ASPP (WASPP) for computing hierarchical features. In experiments, a set of dilation rates for ASPP including 6×6, 12×12, 18×18, and 24×24 was adopted, and it was found that WASPP may achieve better performance than WSPP.

In embodiments, for training a full network, a soft-argmin disparity regression method, such as that proposed by GCNet, may be used to convert a finial discretized disparity to continuous values.

$$\hat{d} = \sum_{d=0}^{D_{max}} d \cdot \sigma(-c_d) \quad \text{(Eq. 6)}$$

Then, the continuous disparity may be compared against a ground truth disparity value using the $L_1$ loss. Formally, the loss function is defined as:

$$L(d^*, \hat{d}) = 1/N \sum_{i=1}^{N} \|d^* - \hat{d}\|_1 \quad \text{(Eq. 7)}$$

where $d^*$ is a ground truth disparity, and $\hat{d}$ is the predicted disparity from Eq. (6).

D. Experiments

It shall be noted that these experiments and results are provided by way of illustration and were performed under specific conditions using a specific embodiment or embodiments; accordingly, neither these experiments nor their results shall be used to limit the scope of the disclosure of the current patent document. Various implementation details, datasets, and evaluation metrics used in experiments are described. An evaluation of CSPN on various tasks is presented.

1. Depth Estimation and Depth Completion

In this section, conjunct algorithms with single image as input are evaluated, including the tasks of single image depth estimation and depth completion with sparse points.

Implementation Details.

The weights of ResNet in the encoding layers for depth estimation (Sec. C.3) may be initialized with models pre-trained on the ImageNet dataset. In embodiments, models may be trained using a stochastic gradient descent (SGD) optimizer and a small batch size of, e.g., 24 to train for 40 epochs, and the model that performs the best on a validation set may be used for testing. In embodiments, the learning rate may start at 0.01 and may be reduced, e.g., by 20% for every 10 epochs. In addition, a small weight decay of $10^{-4}$ may be applied for regularization. In embodiments, networks may be implemented based on a PyTorch platform using element-wise product and convolution operation for a one-step CSPN implementation. Depth results show that propagation using a hidden representation H may achieve only a marginal improvement over propagation within the domain of depth D. Therefore, experiments herein were performed directly using D rather than learning an additional embedding layer. For sparse depth samples, 500 sparse samples were used.

Figure 9A:
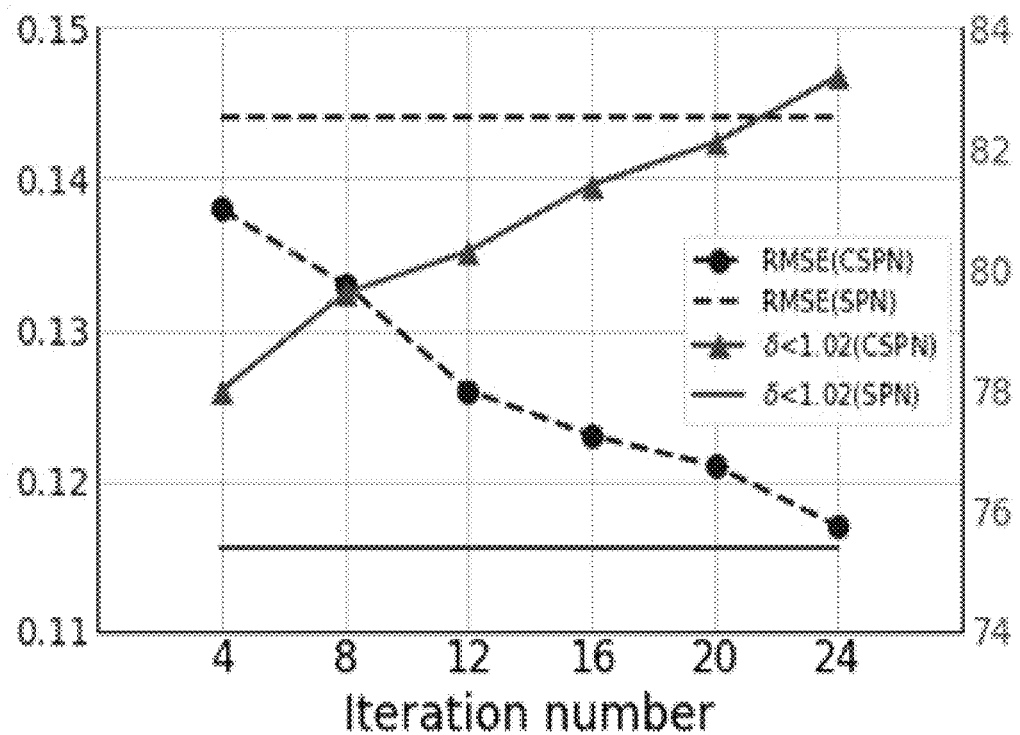
FIG. 9A-FIG. 9C show the results of an ablation study using various embodiments of the present disclosure.
Figure 9B:
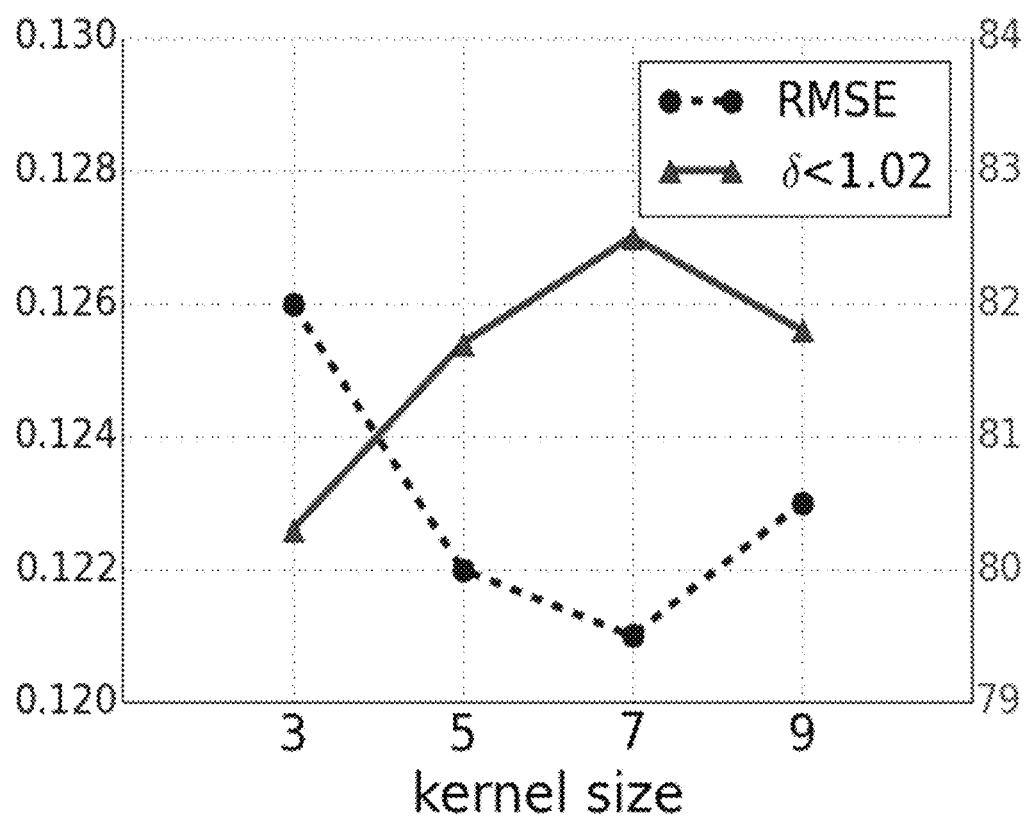
Figure 9C:
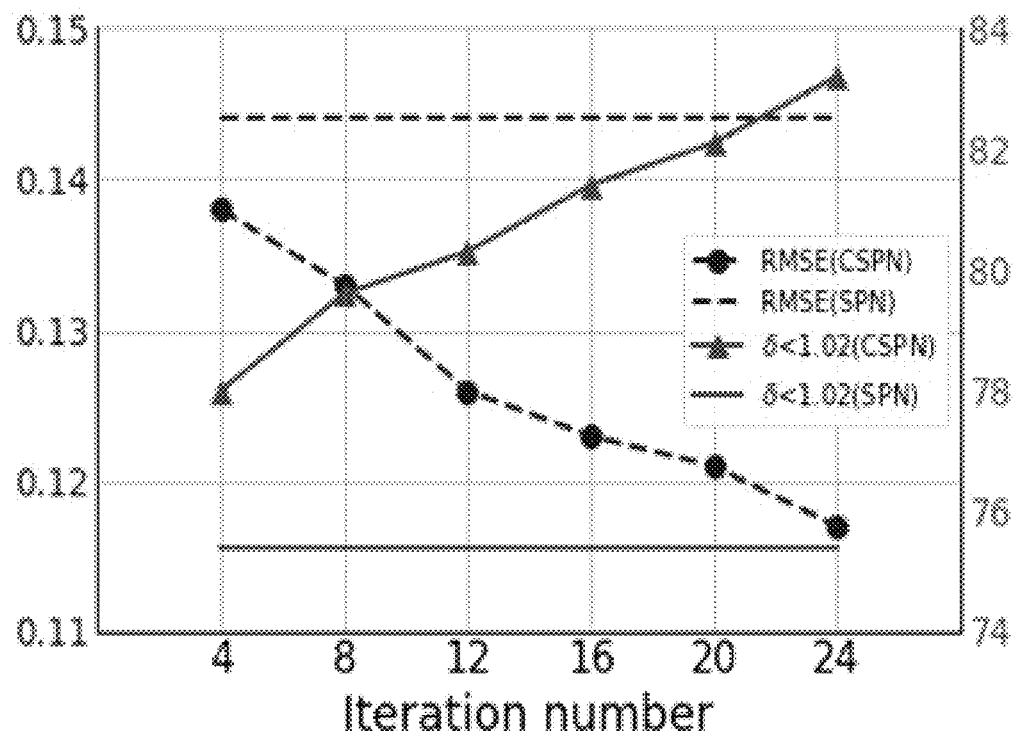

FIG. 9A-FIG. 9C show the results of an ablation study using various embodiments of the present disclosure. FIG. 9A illustrates RMSE (left axis, lower numbers indicating better results) and δ<1.02 (right axis, higher numbers indicating better results) of a CSPN according to embodiments with respect to the number of iterations. Horizontal lines show the corresponding results of the SPN by Liu et al. FIG. 9B illustrates RMSE and δ<1.02 of a CSPN according to embodiments with respect to kernel size. FIG. 9C illustrates testing times with respect to input image size.

a) Dataset and Metrics

Various experiments have been evaluated on the NYU v2 dataset, using commonly used metrics. The NYU-Depth-v2 dataset consists of RGB and depth images collected from 464 different indoor scenes. See Silberman et al., Indoor segmentation and support inference from RGBD images, Proceedings of the 12th European conference on Computer Vision, October 07-13, 2012, Florence, Italy. Experiments herein use the official split of data, i.e., 249 scenes are used for training and 50 k images form the training set are sampled in a same manner as existing approaches. For testing, a standard setting using a small labeled test set with 654 images is used in the final performance. The original image of size 640×480 pixels was first downsampled to half size and then center-cropped, producing a network input size of 304×228 pixels.

Metrics.

Metrics and implementations similar to existing ones are used. Given ground truth depth $D^*=\{d^*\}$ and predicted depth $D=\{d\}$, the metrics may include:

(1) $RMSE \sqrt{\frac{1}{|D|}\sum_{d \in D} \|d^* - \hat{d}\|^2}$;

(2) Abs Rel: $\frac{1}{|D|}\sum_{d \in D} |d^* - d|/d^*$; and (3) $\delta_t$: % of $d \in D$, s.t. $\max\left(\frac{d^*}{d}, \frac{d}{d^*}\right) < t$, where $t \in \{1.25, 1.25^2, 1.25^3\}$.

Nevertheless, for metric (3), the depth accuracy was found to be relatively high when sparse depth is provided, t=1.25 is already a very loose criterion where almost 100% of pixels are judged as correct, which can hardly distinguish different methods as shown in (Tab. 1). Thus, in embodiments, stricter criteria for correctness are adopted, e.g., by choosing $t \in \{1.02, 1.05, 1.10\}$.

b) Ablation Study for CSPN Module

Experiments herein evaluate various hyper-parameters, including kernel size k, and number of iterations N in Eq. (1) using the NYU v2 dataset. An empirical evaluation of the running speed on a Titan×GPU on a computer with 16 GB memory is presented.

Number of Iterations.

A kernel size of 3 may be used to validate the effect of iteration number N in a CSPN. As shown in FIG. 9A, a CSPN according to embodiments may outperform a SPN even when only four iterations are used; and even better performance may be achieved when the number of iterations applied to the model during training is increased. In these experiments, the accuracy is saturated when the number of iterations is increased to 24.

Size of Convolutional Kernel.

As shown in FIG. 9B, a larger convolutional kernel may have a similar effect as an increase in the number of iterations, e.g., due to a larger context that is considered for propagation at each time step. In FIG. 9B, where the number of iterations N is 12, it can be seen that the performance increases with increasing k until saturation occurs at a kernel size of about 7, and the performance slightly drops once the kernel size is set to 9. This may be caused by the fixed number of epochs, i.e., 40, used for experiments, while a larger kernel size may induce more affinity to learn in propagation, which may require a larger number of epochs of data to converge. Experiments show that when more epochs are used to train, a similar performance may be reached as when using a kernel size of 7. Thus, using a kernel size of 7 with 12 iterations may reach a similar performance as using a kernel size of 3 with 20 iterations, which may indicate that a CSPN's trade-off between kernel size and number of iterations. In embodiments, the two settings may run with similar speed, while the latter may cost less memory. Therefore, for purposes of comparison, a kernel size of 3 and a number of iterations of 24 were used.

Concatenation end-point for mirror connection. As discussed in Sec. C.3, based on the given metrics, we experimented three concatenation places, i.e., after conv, after bn and after relu by fine-tuning with weights initialized from encoder network trained without mirror connections. The corresponding RMSE are 0.531, 0.158, and 0.137 correspondingly. Therefore, we adopt the proposed concatenation end-point.

Running speed. FIG. 9C is a running time comparison between SPN and CSPN with a kernel sizes of 3. We use the author's PyTorch implementation online. As can be seen, a better performance may be achieved in relatively less time. For example, four iterations of CSPN on a 1024×768 pixel image take 3.689 ms, while SPN take 127.902 ms. In addition, the time cost of SPN is linearly increasing with image size, while the time cost of CSPN is independent of image size and relatively faster as analyzed in Sec. C.3. In practice, however, when the number of iterations is large, e.g., "CSPN Iter 20," experiments showed that the practical time cost of CSPN also grows with image size. This is because the tested PyTorch-based implementation keeps all variables for each iteration in memory during the testing phase. Memory paging cost becomes dominant for large images. In principle, such a memory bottleneck may be eliminated, e.g., by customizing a new operation. Yet, even without such coding optimization, even at high iterations with large images, the speed of CSPN is still twice as fast as that for SPN.

c) Comparisons

Embodiments are compared against various existing baselines in terms of the two proposed tasks. (1) Refining the depth map using the corresponding color image. (2) Refining the depth map using both the color image and sparse depth samples. For the baseline methods, such as SPN and Sparse-to-Dense, released code was used.

Table 1 shows qualitative comparison results, using the NYU v2 dataset, between embodiments that use a CSPN according to embodiments and other methods. The term "Preserve SD" in Table 1 refers to preserving the depth value at sparse depth samples.

TABLE 1

| Method | Preserve "SD" | lower = better | | higher = better | | | | | |
|---|---|---|---|---|---|---|---|---|---|
| | | RMSE | REL | $\delta_{1:02}$ | $\delta_{1:05}$ | $\delta_{1:10}$ | $\delta_{1:25}$ | $\delta_{1:25}^2$ | $\delta_{1:25}^3$ |
| Ma et al. | | 0.230 | 0.044 | 52.3 | 82.3 | 92.6 | 97.1 | 99.4 | 99.8 |
| +Bilateral | | 0.479 | 0.084 | 29.9 | 58.0 | 77.3 | 92.4 | 97.6 | 98.9 |
| +SPN | | 0.172 | 0.031 | 61.1 | 84.9 | 93.5 | 98.3 | 99.7 | 99.9 |
| +CSPN (Ours) | | 0.162 | 0.028 | 64.6 | 87.7 | 94.9 | 98.6 | 99.7 | 99.9 |
| +UNet (Ours) | | 0.137 | 0.020 | 78.1 | 91.6 | 96.2 | 98.9 | 99.8 | 100.0 |

| | | | | | | | | | |
|---|---|---|---|---|---|---|---|---|---|
| +ASAP | ✓ | 0.232 | 0.037 | 59.7 | 82.5 | 91.3 | 97.0 | 99.2 | 99.7 |
| +Replacement | ✓ | 0.168 | 0.032 | 56.5 | 85.7 | 94.4 | 98.4 | 99.7 | 99.8 |
| +SPN | ✓ | 0.162 | 0.027 | 67.5 | 87.9 | 94.7 | 98.5 | 99.7 | 99.9 |
| +UNet(Ours)+SPN | ✓ | 0.144 | 0.022 | 75.4 | 90.8 | 95.8 | 98.8 | 99.8 | 100.0 |
| +CSPN (Ours) | ✓ | 0.136 | 0.021 | 76.2 | 91.2 | 96.2 | 99.0 | 99.8 | 100.0 |
| +UNet+CSPN (Ours) | ✓ | 0.117 | 0.016 | 83.2 | 93.4 | 97.1 | 99.2 | 99.9 | 100.0 |

NYU v2. Baseline methods are the depth output from an existing network, together with the corresponding color image. The upper part of Table 1 shows the results for depth refinement with color only. Row labeled "Bilateral" illustrates refining the network output using bilateral filtering as a post-processing module with their spatial-color affinity kernel tuned on a validation set. Although the output depths snap to image edges (1000c in FIG. 1), the absolute depth accuracy is dropped since the filtering over-smoothed original depths. The row labeled "SPN" illustrates the results filtered with SPN, using an affinity network according to embodiments. Due to joint training, the depth is improved with the learned affinity, yielding both better depth details and absolute accuracy. Switching from SPN to CSPN (row "CSPN") yields relative better results. Finally, the row labeled "UNet" shows the results of modifying the network with mirror connections as stated in Sec. C.3. The results turn out to be even better than those from SPN and CSPN, demonstrating that by simply adding features from beginning layers, the depth can be better learned.

The lower part of Table 1 shows the results of using both color image and sparse depth samples, and all the results preserve the sparse depth value provided. Per image, 500 depth samples are randomly selected from the ground truth depth map. For comparison, a baseline method is considered using as-rigid-as-possible (ASAP) warping. Basically, the input depth map is warped with the sparse depth samples as control points. The row labeled "ASAP" shows that the estimation over the baseline network improve just marginally. For SPN, also a similar replacement operation as in Eq. (4) is applied for propagation. The results are shown at the row labeled "SPN," which outperforms both the results from ASAP and SPN without propagation of SD since joint training helps to correct the error of warping. At the row labeled "UNet+SPN," we use our UNet architecture for learning affinity with SPN, which outperforms "SPN," while no improvements were observed over using only UNet. Nevertheless, by replacing SPN with CSPN according to embodiments, as shown in the row labeled "UNet+CSPN," the results can be further improved by a large margin and performs best in all cases. This may be caused by CSPN updating more efficiently than SPN during training.

Figure 10:
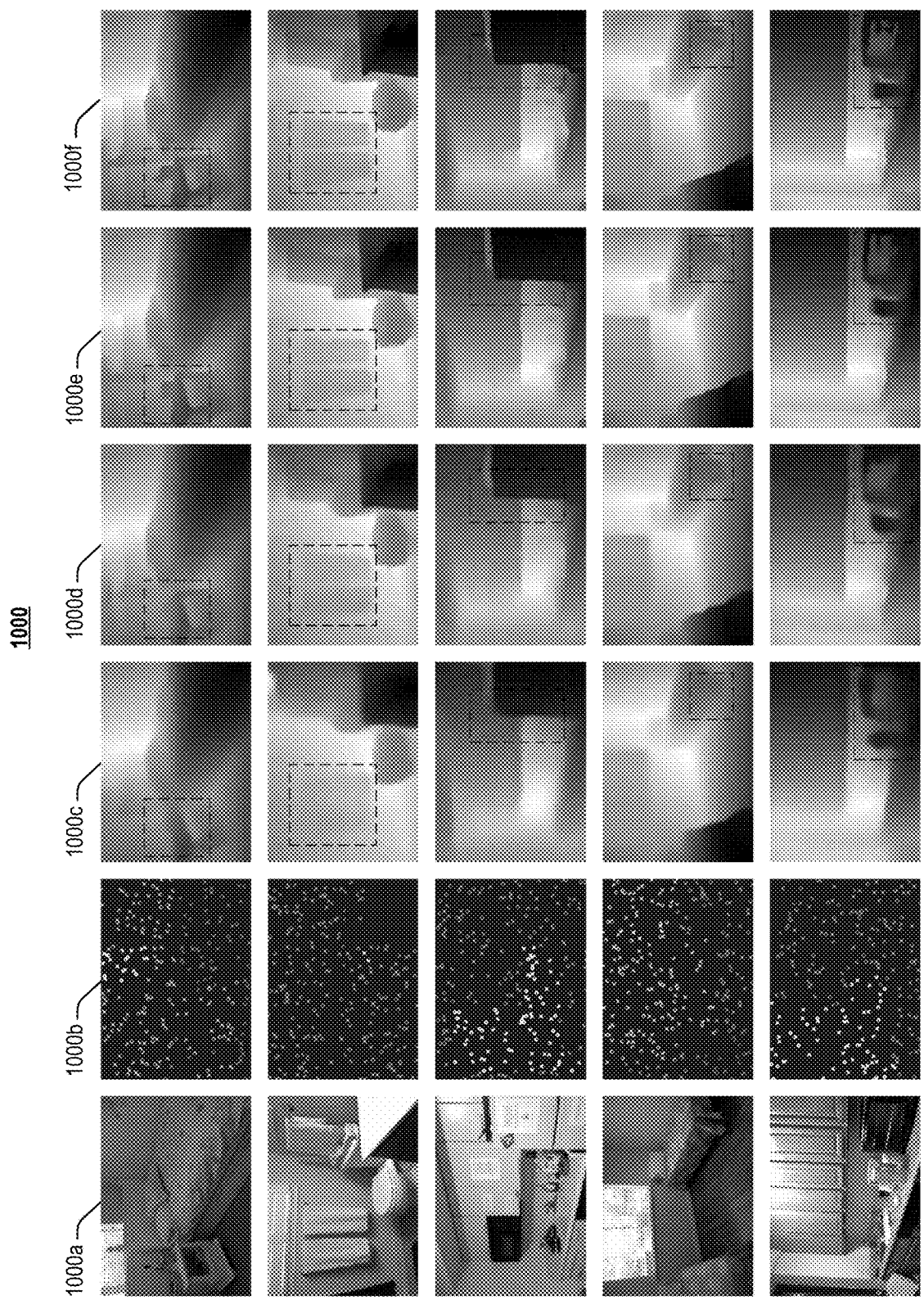
FIG. 10 shows exemplary visualizations according to various embodiments of the present disclosure.

FIG. 10 shows exemplary visualizations according to various embodiments of the present disclosure. 1000a shows input images. 1000b shows 500 sparse depth samples. 1000c illustrates depth using an existing approach. FIG. 10D illustrates UNet(Ours)+SPN. FIG. 10e illustrates UNet+CSPN(Ours). 1000f illustrates the Ground Truth. Most significantly improved regions are highlighted within dashed boxes (best viewed in color).

A comparison of structures in dashed bounding boxes in FIG. 10 shows that the results of using a CSPN according to embodiments better capture structures in input images FIG. 1000a than existing methods, such as those represented by 1000c.

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, tablet, personal digital assistant (PDA), smart phone, smart watch, smart package, server (e.g., blade server or rack server), a network storage device, camera, or any other suitable device and may vary in size, shape, performance, functionality, and price. Such a computing system may be placed in a vehicle and coupled to GPS and camera inputs. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 11:
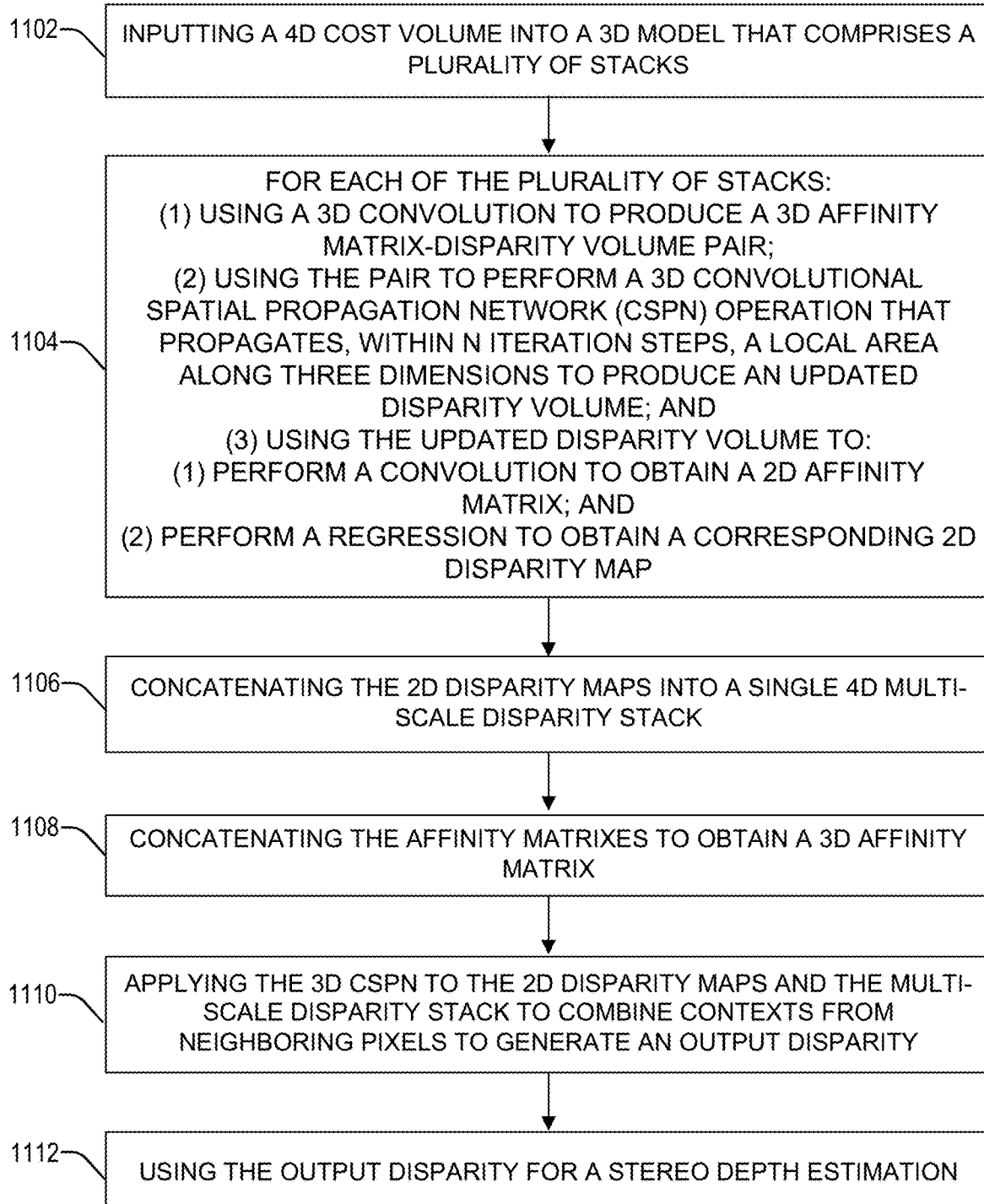
FIG. 11 is a flowchart of an illustrative process for end-to-end training a 3D model for stereo depth estimation, according to various embodiments of the present disclosure.

FIG. 11 is a flowchart of an illustrative process for end-to-end training a 3D model for stereo depth estimation, according to various embodiments of the present disclosure. Process (1100) for training the 3D model may begin when a 4D cost volume is input (1102) into a 3D model that comprises a plurality of stacks. In embodiments, the 4D cost volume may use pooling results from spatial pooling modules to which feature maps are applied. The feature maps may be obtained in response to inputting a stereo image pair into respective CNNs that share a set of weights.

In embodiments, the CNN for each of the plurality of stacks (1104) a 3D convolution may produce a 3D affinity matrix-disparity volume pair that is used to perform a 3D CSPN operation that propagates, e.g., within N iteration steps, a local area along three dimensions to produce an updated disparity volume. The updated disparity volume may be used to perform a 2D convolution to obtain a 2D affinity matrix and to perform a disparity regression to obtain a corresponding 2D disparity map. It is understood that an affinity matrix may equally be generated by different CNN.

In embodiments, the 2D disparity maps may be concatenated (1106) into a multi-scale disparity stack, and the 2D affinity matrixes may be concatenated (1108) to obtain a 3D affinity matrix. In embodiments, the 3D CSPN may be applied (1110) to the 2D disparity maps and the multi-scale disparity stack to combine contexts from neighboring pixels to generate an output disparity map.

In embodiments, the output disparity map may then be used for stereo depth estimation (1112), and error may be calculated and backpropagated. In embodiments, process 1100 may be iterated until a stop condition is reached.

Figure 12:
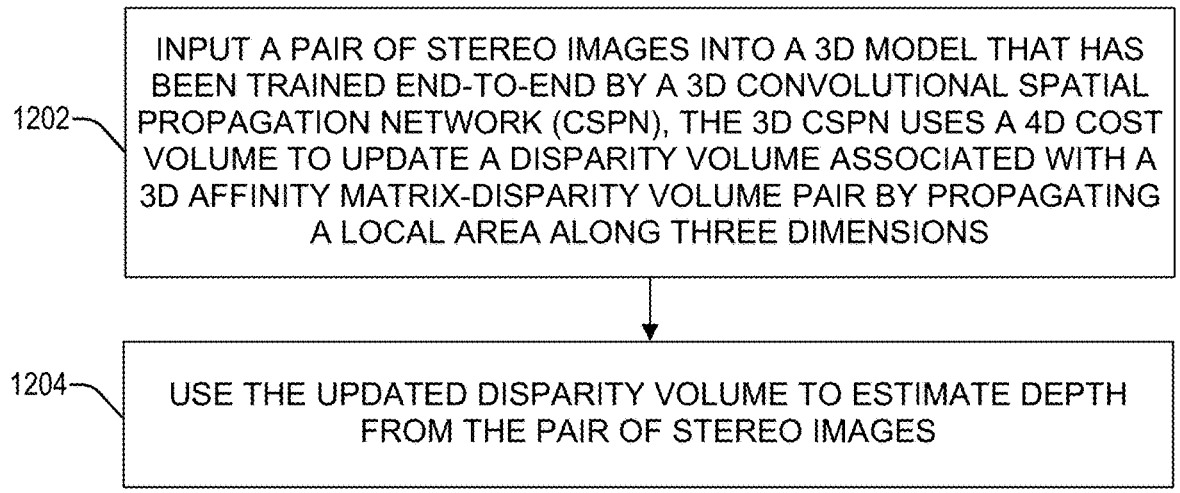
FIG. 12 a flowchart of an illustrative process for estimating stereo depth from a stereo image pair, according to various embodiments of the present disclosure.

FIG. 12 a flowchart of an illustrative process for estimating stereo depth from stereo image pair, according to various embodiments of the present disclosure. Process 1200 for estimating stereo depth begins at step when a stereo image is input (1202) into a 3D model that has been trained end-to-end by using a 3D CSPN that uses a 4D cost volume to update a disparity volume associated with a 3D affinity matrix-disparity volume pair by propagating a local area along three dimensions.

In embodiments, the updated disparity volume is then used to estimate depth (1204) from the stereo image pair.

Figure 13:
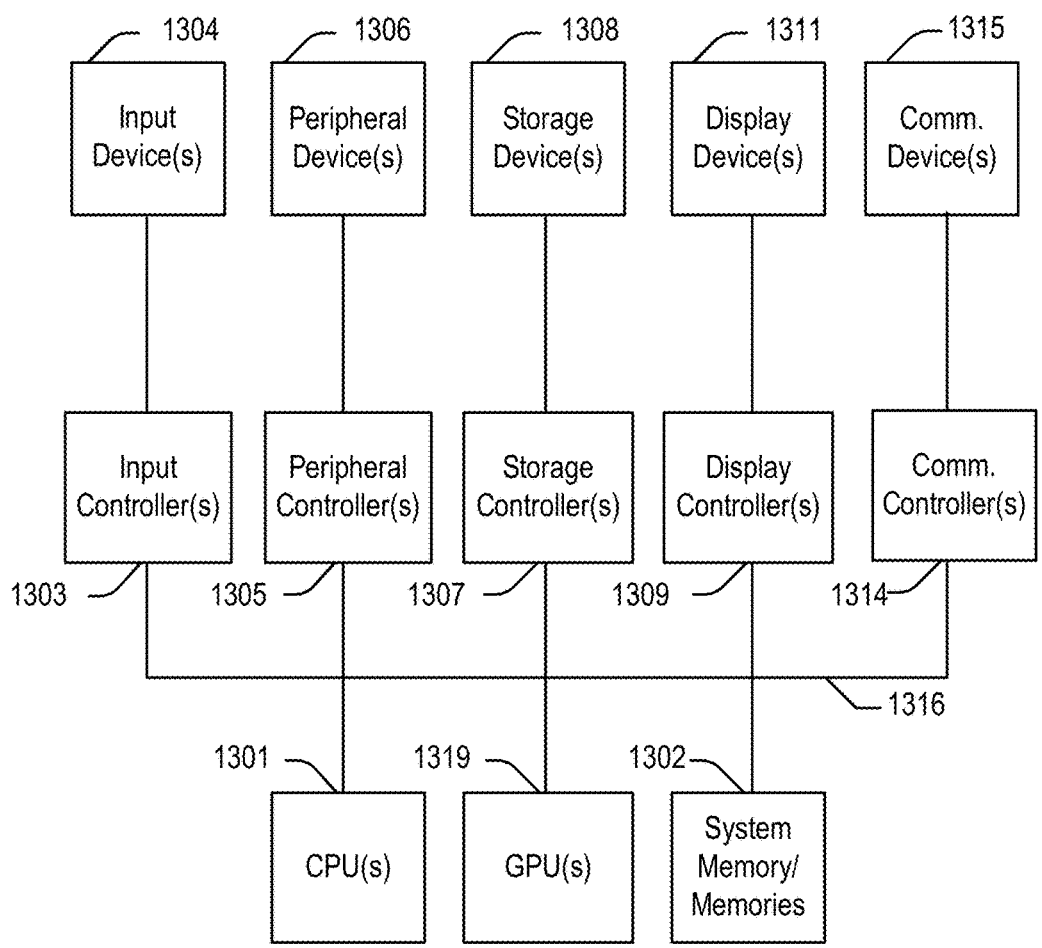
FIG. 13 depicts a simplified block diagram of a computing device/information handling system (or computing system) according to embodiments of the present disclosure.

FIG. 13 depicts a simplified block diagram of a computing device/information handling system (or computing system) according to embodiments of the present disclosure. It will be understood that the functionalities shown for system 1300 may operate to support various embodiments of a computing system—although it shall be understood that a computing system may be differently configured and include different components, including having fewer or more components as depicted in FIG. 13.

As illustrated in FIG. 13, the computing system 1300 includes one or more central processing units (CPU) 1301 that provides computing resources and controls the computer. CPU 1301 may be implemented with a microprocessor or the like, and may also include one or more GPU 1319 and/or a floating-point coprocessor for mathematical computations. System 1300 may also include a system memory 1302, which may be in the form of random-access memory (RAM), read-only memory (ROM), or both.

A number of controllers and peripheral may also be provided, as shown in FIG. 13. An input controller 1303 represents an interface to various input device(s) 1304, such as a keyboard, mouse, touchscreen, and/or stylus. The computing system 1300 may also include a storage controller 1307 for interfacing with one or more storage devices 1308 each of which includes a storage medium such as magnetic tape or disk, or an optical medium that might be used to record programs of instructions for operating systems, utilities, and applications, which may include embodiments of programs that implement various aspects of the present disclosure. Storage device(s) 1308 may also be used to store processed data or data to be processed in accordance with the disclosure. The system 1300 may also include a display controller 1309 for providing an interface to a display device 1311, which may be a cathode ray tube (CRT), a thin film transistor (TFT) display, organic light-emitting diode, electroluminescent panel, plasma panel, or other type of display. The computing system 1300 may also include one or more peripheral controllers or interfaces 1305 for one or more peripheral devices 1306. Examples of peripheral devices may include one or more printers, scanners, input devices, output devices, sensors, and the like. A communications controller 1314 may interface with one or more communication devices 1315, which enables the system 1300 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for end-to-end training a 3D model for stereo depth estimation, the method comprising:
   receiving, at a 3D model that comprises a plurality of stacks, a 4D cost volume that uses feature maps produced from a stereo image pair;
   for each of the plurality of stacks:
      using a 3D convolution to produce a 3D affinity matrix-disparity volume pair;
      using the pair to perform a 3D convolutional spatial propagation network (3D CSPN) operation that propagates, within N iteration steps, a local area along three dimensions to produce an updated disparity volume; and
      using the updated disparity volume to:
         perform a 2D convolution to obtain a 2D affinity matrix; and
         perform a disparity regression to obtain a corresponding 2D disparity map;
   concatenating the 2D disparity maps into a multi-scale disparity stack;
   concatenating the 2D affinity matrixes to obtain a 3D affinity matrix;
   applying the 3D CSPN to the multi-scale disparity stack and the 3D affinity matrix to combine contexts from neighboring pixels to generate an output disparity map; and
   using the output disparity map to obtain a stereo depth estimation.

2. The method according to claim 1, further comprising:
   given a feature map and target size for a pooled feature map, partitioning a weight map into pooling regions;
   within each region, applying a 3D CSPN to a spatial pyramid pooling (SPP) module to compute a pooling kernel; and
   outputting a 1-channel weight map.

3. The method according to claim 2, further comprising using the spatial pooling modules to:
   concatenate features of a spatial pyramid into the 4D volume; and
   for each layer of the spatial pyramid, learning a transformation kernel to obtain fused feature map.

4. The method according to claim 1, wherein the 4D cost volume has been generated by:
   applying convolutional neural networks (CNNs) that share a set of weights to the stereo image pair to obtain the feature maps;
   applying the feature maps to respective spatial pooling modules that generate pooling results; and
   using the pooling results to form the 4D cost volume.

5. The method according to claim 4, wherein applying the feature maps to the spatial pooling modules comprises concatenating representations from sub-regions that have different sizes.

6. The method according to claim 4, further comprising padding the feature maps to obtain a single regressed disparity map for a final depth estimation.

7. The method according to claim 6, wherein a padding dimension is reduced to 1 within a single iteration.

8. The method according to claim 1, wherein the 3D affinity matrix-disparity volume pair is produced by applying by applying a 3D convolution to a network to capture a global image context.

9. The method according to claim 1, wherein the 3D affinity matrix has been generated by the by at least one CNN.

10. The method according to claim 1, further comprising bilinearly upsampling the updated disparity volume.

11. A method for stereo depth estimation from stereo image pair, the method comprising:
    receiving a stereo image pair by a 3D model that has been trained end-to-end by using a 3D convolutional spatial propagation network (CSPN) that, in response to receiving a 4D cost volume, updates a disparity volume associated with a 3D affinity matrix-disparity volume pair by propagating a local area along three dimensions; and
    using the updated disparity volume to estimate a stereo depth from the stereo image pair.

12. The method according to claim 11, further comprising given a feature map and target size for a pooled feature map, partitioning a weight map into pooling regions;
    within each region, applying a 3D CSPN to a spatial pyramid pooling (SPP) module to compute a pooling kernel; and
    outputting a 1-channel weight map.

13. The method according to claim 11, further comprising using the spatial pooling modules to:
    concatenate features of a spatial pyramid into the 4D volume; and
    for each layer of the spatial pyramid, learning a transformation kernel to obtain fused feature map.

14. The method according to claim 11, wherein the updated disparity volume is used to perform a 2D convolution to obtain a 2D affinity matrix that is concatenated to obtain a 3D affinity matrix, and to perform a disparity regression to obtain a 2D disparity map that is concatenated into a multi-scale disparity stack.

15. The method according to claim 11, wherein the 3D CSPN is applied to the 2D disparity maps and the multi-scale disparity stack to combine contexts from neighboring pixels to generate an output disparity map that is used to obtain a single regressed disparity map for a final depth estimation.

16. A disparity map acquisition system for performing a disparity regression for stereo depth estimation, the system comprising:
    a processor; and
    a non-transitory computer-readable medium comprising instructions that, when executed by the processor, cause steps to be performed, the steps comprising:
    receiving, at a 3D model that comprises a plurality of stacks, a 4D cost volume that uses feature maps produced from a stereo image pair;
    for each of the plurality of stacks:
       using a 3D convolution to produce a 3D affinity matrix-disparity volume pair;
       using the pair to perform a 3D convolutional spatial propagation network (3D CSPN) operation that propagates, within N iteration steps, a local area along three dimensions to produce an updated disparity volume; and
       using the updated disparity volume to:
          perform a 2D convolution to obtain a 2D affinity matrix; and perform a disparity regression to obtain a corresponding 2D disparity map;
concatenating the 2D disparity maps into a multi-scale disparity stack;
concatenating the 2D affinity matrixes to obtain a 3D affinity matrix;
applying the 3D CSPN to the multi-scale disparity stack and the 3D affinity matrix to combine contexts from neighboring pixels to generate an output disparity map; and
using the output disparity map to obtain a stereo depth estimation.

17. The disparity map acquisition system according to claim 16, further comprising:
given a feature map and target size for a pooled feature map, partitioning a weight map into pooling regions;
within each region, applying a 3D CSPN to a spatial pyramid pooling (SPP) module to compute a pooling kernel; and
outputting a 1-channel weight map.

18. The disparity map acquisition system according to claim 17, further comprising using the spatial pooling modules to:
concatenate features of a spatial pyramid into the 4D volume; and
for each layer of the spatial pyramid, learning a transformation kernel to obtain fused feature map.

19. The disparity map acquisition system according to claim 16, wherein the 4D cost volume has been generated by:
applying convolutional neural networks (CNNs) that share a set of weights to a stereo image pair to obtain feature maps;
applying the feature maps to respective spatial pooling modules that generate pooling results, wherein applying the feature maps to the spatial pooling modules comprises concatenating representations from sub-regions that have different sizes; and
using the pooling results to form the 4D cost volume.

20. The disparity map acquisition system according to claim 16, further comprising padding the feature maps to obtain a single regressed disparity map for a final depth estimation, the padding dimension being reduced to 1 within a single iteration.

* * * * *